United States Patent
Nishikawa

(10) Patent No.: US 8,736,871 B2
(45) Date of Patent: May 27, 2014

(54) IMAGE PROCESSING APPARATUS AND IMAGE PROCESSING METHOD

(75) Inventor: Naoyuki Nishikawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 611 days.

(21) Appl. No.: 12/843,772

(22) Filed: Jul. 26, 2010

(65) Prior Publication Data

US 2011/0026078 A1 Feb. 3, 2011

(30) Foreign Application Priority Data

Jul. 29, 2009 (JP) ................... 2009-176928

(51) Int. Cl.
*G06F 15/00* (2006.01)

(52) U.S. Cl.
USPC ......... 358/1.15; 358/1.18; 358/3.06; 382/224

(58) Field of Classification Search
None
See application file for complete search history.

(56) References Cited

U.S. PATENT DOCUMENTS

| | | | |
|---|---|---|---|
| 5,852,679 A | 12/1998 | Shimizu | |
| 2007/0177173 A1* | 8/2007 | Nishikawa | 358/1.9 |
| 2010/0171992 A1* | 7/2010 | Pinney | 358/3.29 |

FOREIGN PATENT DOCUMENTS

| | | |
|---|---|---|
| JP | 04-170686 A | 6/1992 |
| JP | 05-258073 A | 10/1993 |
| JP | 08-72317 A | 3/1996 |
| JP | 09-282474 A | 10/1997 |
| JP | 11-232473 A | 8/1999 |
| JP | 2001-109899 A | 4/2001 |
| JP | 2005-267290 A | 9/2005 |
| JP | 2005-267639 A | 9/2005 |
| JP | 2006-270260 A | 10/2006 |
| JP | 2006-289642 A | 10/2006 |
| JP | 2007-122188 A | 5/2007 |
| JP | 2009-134620 A | 6/2009 |

OTHER PUBLICATIONS

Rogers, David F., "Procedural Elements for Computer Graphics", McGraw-Hill International Editions, Computer Science Series, ISBN 0-07-Y66503-6, Chapter 2-2 Digital Differential Analyzer, pp. 29-34.

* cited by examiner

*Primary Examiner* — Vincent Rudolph
*Assistant Examiner* — Helen Q Zong
(74) *Attorney, Agent, or Firm* — Canon USA, Inc., IP Division

(57) ABSTRACT

An image processing apparatus for performing rendering processing includes an input unit configured to input information relating to an object, a classification unit configured to classify a graphic type of the object based on the information relating to the object, and a processing unit configured to switch a processing procedure according to the graphic type classified by the classification unit to generate edge information relating to the rendering processing.

10 Claims, 25 Drawing Sheets

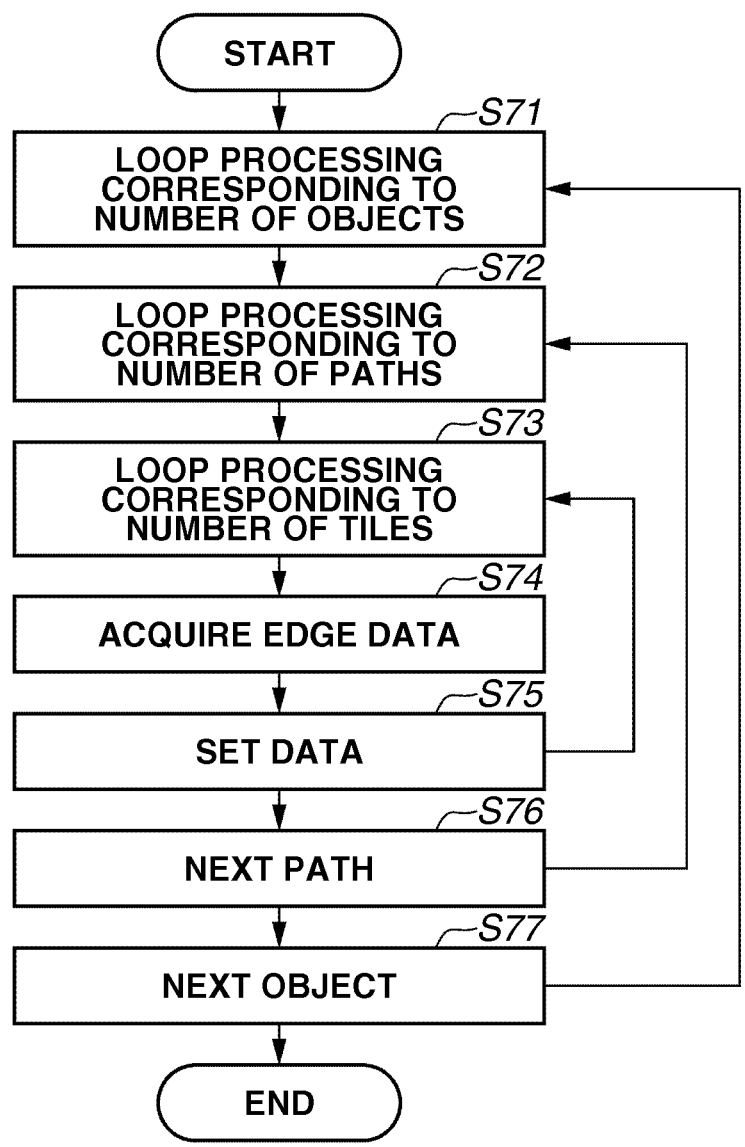

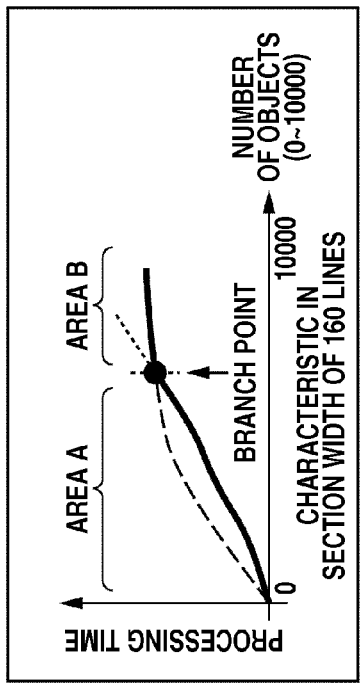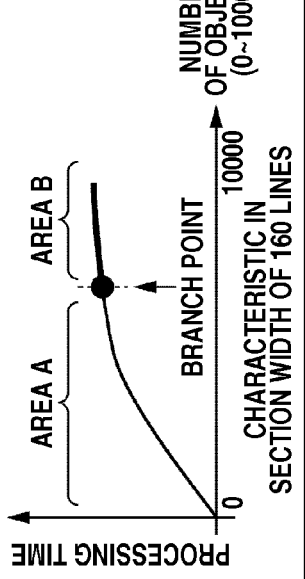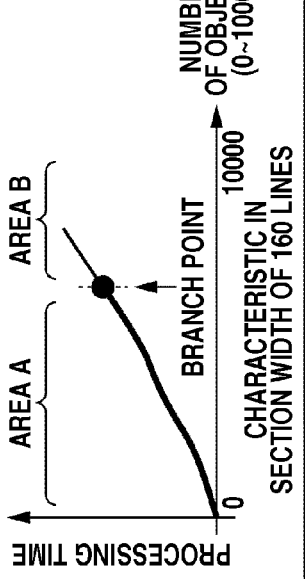

IMAGE PROCESSING APPARATUS AND IMAGE PROCESSING METHOD

BACKGROUND OF THE INVENTION

1. Field of the Invention

The present invention relates to an image processing apparatus and an image processing method, and more particularly to an image processing technique for generating edge information, which is adaptable to rendering processing or the like.

2. Description of the Related Art

Conventionally, a rendering method for extracting contour information (also referred to as edge information) relating to a graphic from coordinate information relating to the graphic to draw the graphic and forming an image based on the contour information has generally been used widely (e.g., Japanese Patent Application Laid-Open Nos. 04-170686, 08-72317, 2005-267290, and 2007-122188). While the contour information is represented by a straight line, a digital differential analyzer (DDA) algorithm has been known as a method for representing the straight line (David Rogers, "Procedural Elements for Computer Graphics", McGraw-Hill Education).

An important requirement is to enable drawing processing to be executed at high speed in rendering processing. However, a period of time consumed to actually perform the rendering processing changes depending on the type of graphic and the number of graphics. Therefore, it is difficult to always carry out rendering fast. In conventional rendering processing, a procedure (algorithm) for performing data processing regardless of a graphic type is fixed. This is insufficient in terms of increasing the speed of the rendering processing.

SUMMARY OF THE INVENTION

The present invention is directed to suitably switching an algorithm according to an input graphic, to enable data processing associated with rendering processing to be performed.

According to an aspect of the present invention, an image processing apparatus for performing rendering processing includes an input unit configured to input information relating to an object, a classification unit configured to classify a graphic type of the object based on the information relating to the object, and a processing unit configured to switch a processing procedure according to the graphic type classified by the classification unit to generate edge information relating to the rendering processing.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 8 is a flowchart illustrating edge information extraction processing in the first exemplary embodiment.

FIGS. 17A to 17C respectively illustrate speed characteristic of edge information extraction processing in algorithms.

DESCRIPTION OF THE EMBODIMENTS

Various exemplary embodiments, features, and aspects of the invention will be described in detail below with reference to the drawings.

Figure 1:
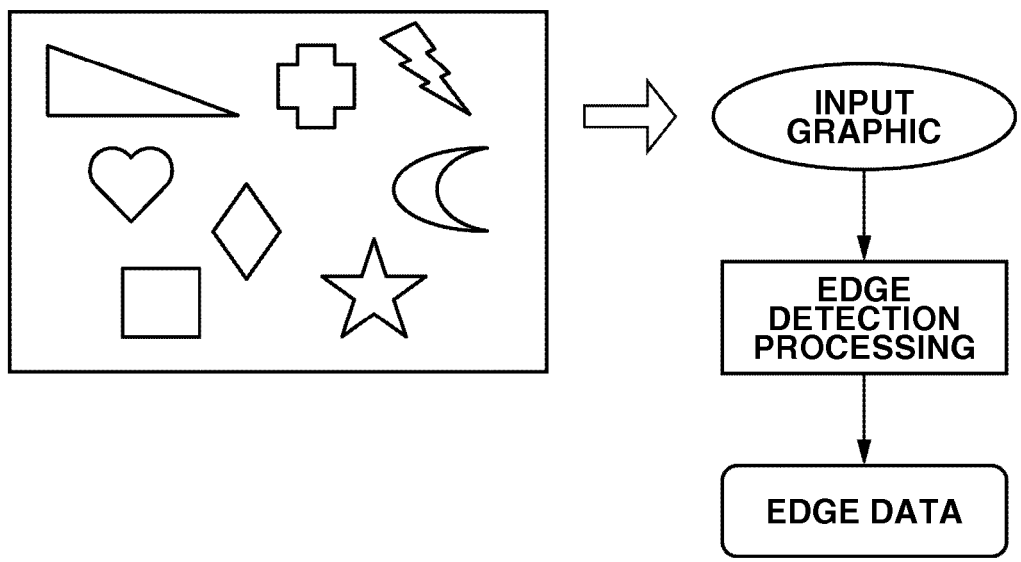
FIG. 1 is a flowchart illustrating an example of rendering processing.

FIG. 1 is a flowchart illustrating an example of rendering processing, illustrating how edge information is extracted from an input graphic. A variety of types of graphics are input to a rendering processing unit (a renderer) for performing rendering processing, as illustrated in FIG. 1. In the processing illustrated in FIG. 1, edge detection processing detects an edge (a contour) from coordinate information relating to an input graphic to generate information relating to lines constituting the graphic.

Figure 2:
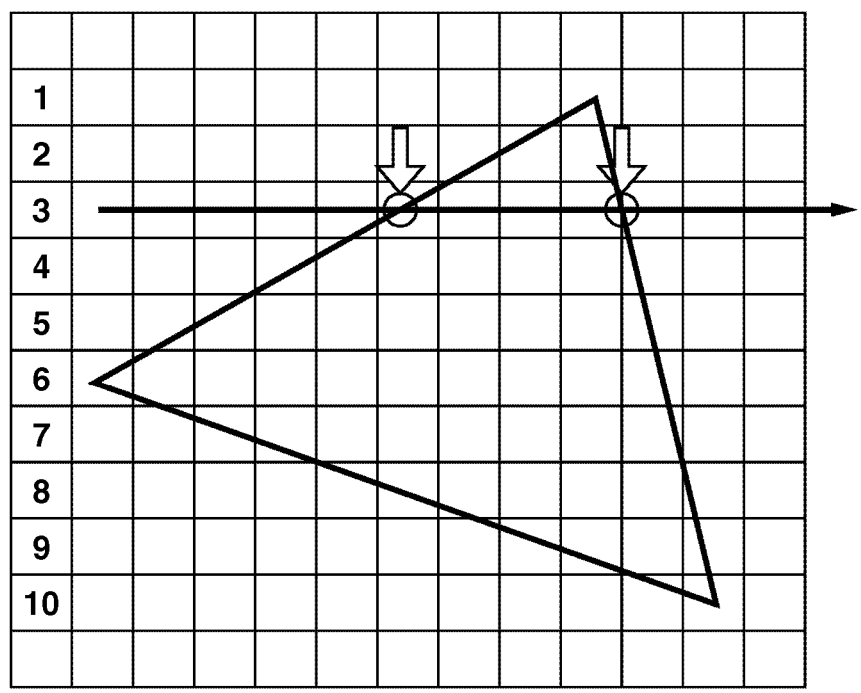
FIG. 2 illustrates scan-line edge extraction processing.

FIG. 2 illustrates how an edge is extracted from a triangular graphic, illustrating an example in which a scan line (horizontal line) crosses the triangular graphic, and two edges are detected, as indicated by arrows. The outline of this processing will be briefly described. Input graphic data are sorted in the Y-direction, and the sorted graphic data are then sequentially accessed to collect data representing X-coordinates. At this time, a data reference table or the like is generated so that the data can be accessed in ascending order of their X-coordinate values. In processing for forming an image, a graphic is scanned in the horizontal direction (in the X-direction), and is repeatedly scanned in the vertical direction (Y-direction), to extract edge information relating to the graphic.

Figure 3:
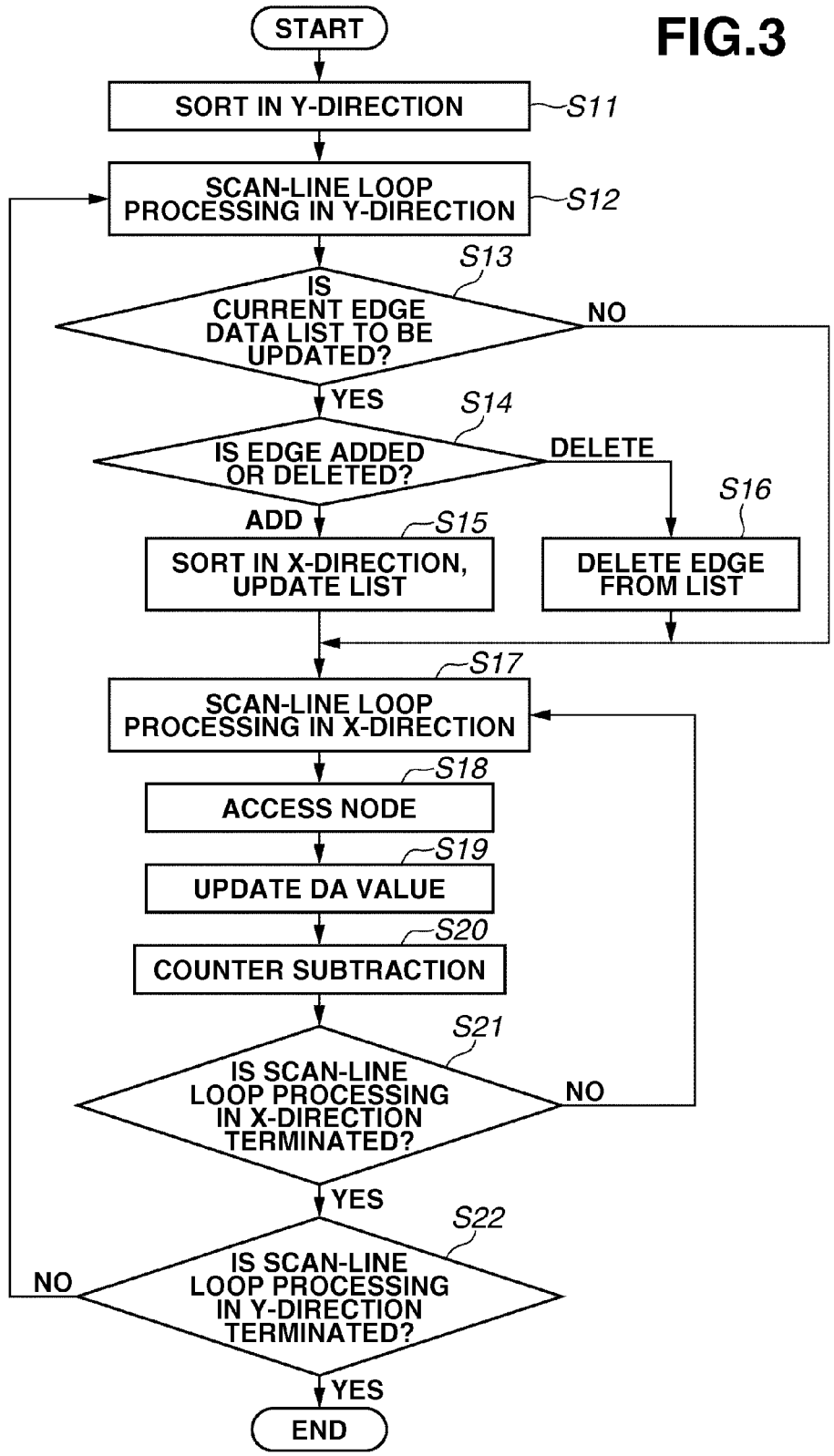
FIG. 3 is a flowchart illustrating the details of edge information extraction processing.

FIG. 3 is a flowchart illustrating the details of processing for extracting edge information from coordinate information relating to an input graphic. When started, the processing proceeds to step S11.

In step S11, a rendering processing unit first sorts input graphic data in the Y-direction, and stores the sorted graphic data. In step S12, the rendering processing unit then starts scan-line loop processing in the Y-direction. In step S13, the rendering processing unit picks up the graphic data that crosses a current scan line, and determines whether edge information (a current edge data list) existing on the scan line is to be updated. If the current edge data list is not to be updated as a result of the determination (NO in step S13), the processing proceeds to step S17. If the current edge data list is to be updated (YES in step S13), the processing proceeds to step S14.

In step S14, the rendering processing unit determines whether edge data is added to or deleted from the current edge data list. If the edge data is added, for example, the scan line newly crosses the contour of a graphic, the processing proceeds to step S15. In step S15, the rendering processing unit adds edge data in ascending order of their edge data values in the X-direction. The added edge data are referred to as nodes. Each of the nodes is connected onto the list. On the other hand, if the scan line departs from the contour of the graphic, the processing proceeds to step S16. In step S16, the rendering processing unit deletes the corresponding edge data from the edge data list, as needed.

In step S17, the rendering processing unit performs loop processing for extracting edge information in the X-direction in the current scan line. In step S18, the rendering processing unit sequentially accesses the nodes on the edge data list. The edge data list is constructed to update a data value (DA value) in the current scan line from information such as the slope of a line segment. In step S19, the rendering processing unit executes processing for updating the DA value.

In step S20, the rendering processing unit then performs counter subtraction processing for the loop processing in the X-direction. In step S21, the rendering processing unit determines whether the loop processing in the X-direction is terminated. If the loop processing in the X-direction is not terminated as a result of the determination (NO in step S21), the processing returns to step S17. If the loop processing in the X-direction is terminated (YES in step S21), the processing proceeds to step S22. In step S22, the rendering processing unit determines whether the loop processing in the Y-direction is terminated. If the loop processing in the Y-direction is not terminated (NO in step S22), the processing returns to step S12. If the loop processing in the Y-direction is terminated (YES in step S12), the processing ends.

The processes in steps S17 to S21 correspond to the loop processing in the X-direction, and the processes in step S12 to S22 correspond to the loop processing in the Y-direction. The contour information (edge information) relating to a graphic on a plane is extracted by such double loop processing.

Figure 4:
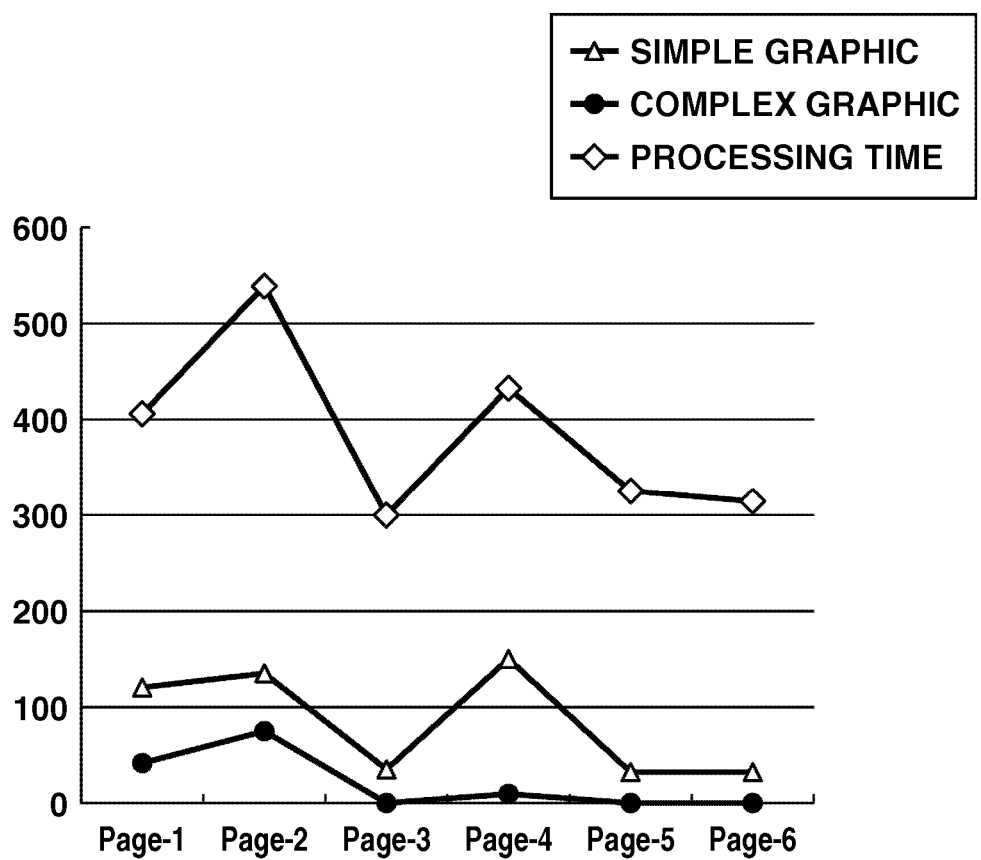
FIG. 4 illustrates an example of a change in a data processing time in a print job.

FIG. 4 is a graph illustrating an example of a change in a data processing time in a print job including the above-mentioned rendering processing. FIG. 4 plots a processing time (millisecond) as the ordinate and a page of the print job as the abscissa. In the example illustrated in FIG. 4, the first page and the second page respectively consume approximately 400 milliseconds and approximately 550 milliseconds to complete the processing. In FIG. 4, a line graph that changes along a line connecting triangular points represents the number (a relative value) of simple graphics included in the job, and a line graph that changes along a line connecting round points represents the number (a relative value) of graphics (referred to as complex graphics for convenience) other than the simple graphics. FIG. 4 indicates that when the print job over a plurality of pages is analyzed, the data processing time differs depending on whether it includes simple graphics such as a rectangle and a triangle or the other complex graphics (e.g., a polygon).

The print job generally tends to include more simple graphics. In order to improve an average print processing period, it is important to determine how efficiently the simple graphics can be processed at high speed. However, a processing procedure (algorithm) for performing data processing is fixed regardless of a graphic type, as illustrated in FIG. 1. In the present exemplary embodiment, the processing procedure (algorithm) for data processing is switched according to the type of an input graphic (an input object), to perform edge information generation processing associated with the rendering processing.

Figure 5:
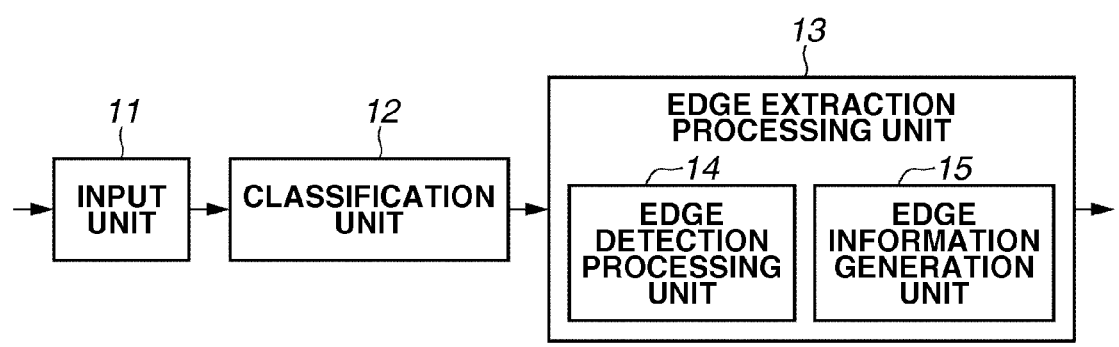
FIG. 5 illustrates an example of a configuration of an image processing apparatus according to an exemplary embodiment of the present invention.

FIG. 5 is a block diagram illustrating an example of the configuration of an image processing apparatus according to an exemplary embodiment of the present invention. The image processing apparatus according to the present exemplary embodiment performs rendering processing for processing graphic data, includes an input unit 11, a classification unit 12, and an edge extraction processing unit 13, and generates, based on coordinate information relating to an input object, edge information serving as contour information relating to the object. A graphic (object) input by the input unit 11 is classified into a simple graphic (a first graphic type) or a complex graphic (a second graphic type) by graphic type determination processing in the classification unit 12.

The edge extraction processing unit 13 includes an edge detection processing unit 14 and an edge information generation unit 15, and performs edge detection by switching an edge trace algorithm according to a result of the classification by the classification unit 12, to generate edge information. For example, the edge detection processing unit 14 performs (tile-based) edge detection processing for an object classified as the simple graphic (first graphic type), and performs the above-mentioned scan-line edge detection processing for an object classified as the complex graphic (second graphic type). The edge information generation unit 15 generates edge information based on a result of the processing in the edge detection processing unit 14.

Figure 6:
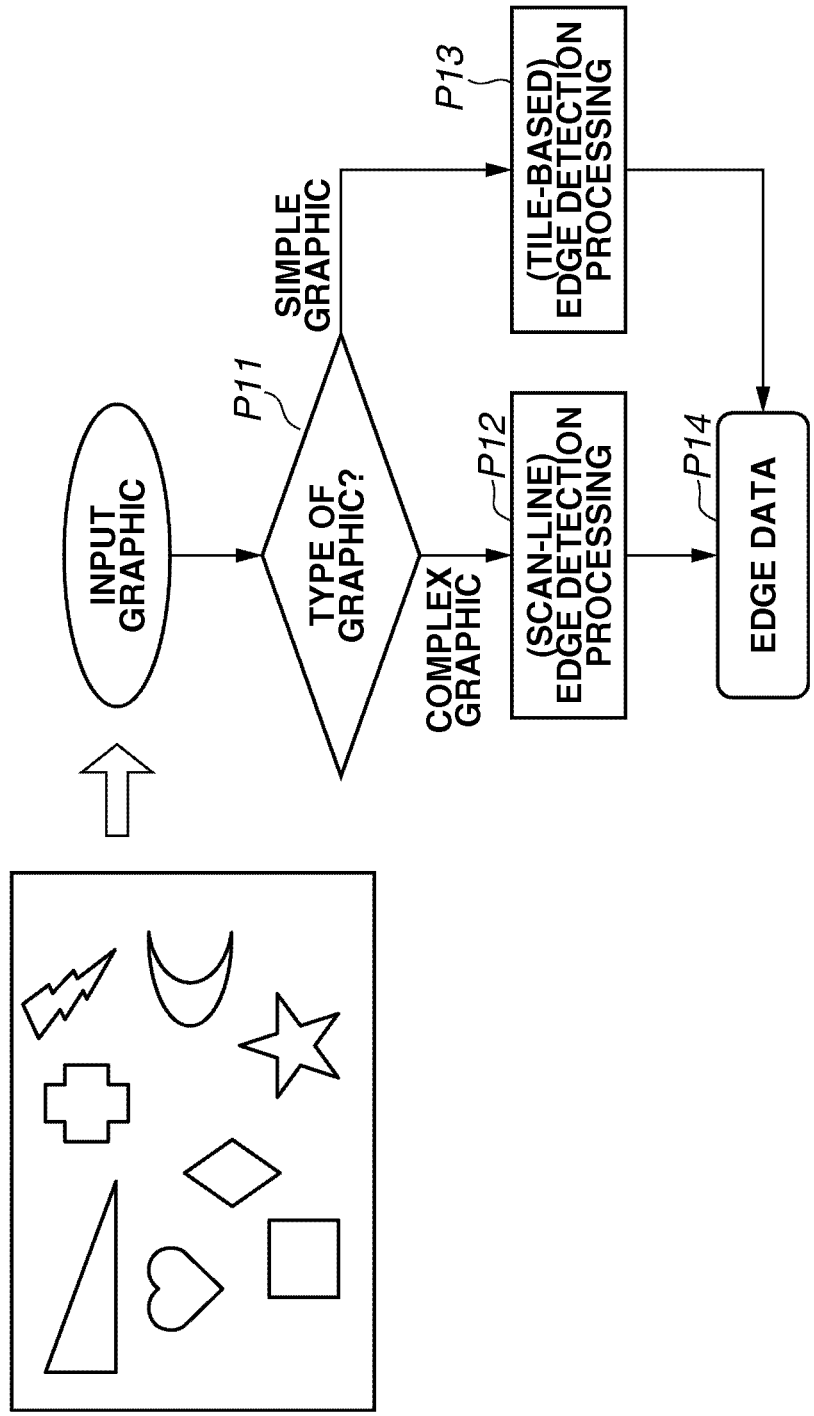
FIG. 6 is a flowchart illustrating an example of operations of an image processing apparatus according to an exemplary embodiment of the present invention.

FIG. 6 is a flowchart illustrating an example of operations of the image processing apparatus according to the present exemplary embodiment, illustrating how edge information is extracted from an input graphic.

The classification unit 12 first performs graphic type determination processing. In step P11, the classification unit 12 classifies a graphic (object) input by the input unit 11 into a simple graphic (a first graphic type) or a complex graphic (a second graphic type). In step P12, the edge detection processing unit 14 in the edge extraction processing unit 13 performs the above-mentioned scan-line edge detection processing for the complex graphics. In step P13, the edge detection processing unit 14 performs tile-based edge detection processing for the simple graphics. The edge information generation unit 15 in the edge extraction processing unit 13 generates edge information relating to the input object based on the result of the edge detection processing.

In the image processing apparatus according to the present exemplary embodiment, a processing procedure is switched according to an input graphic (object) to perform edge detection, to generate edge information based on the result of the edge detection. This enables data processing associated with rendering processing to be performed in a processing procedure suitable for the input graphic, thereby enabling the speed of the rendering processing to be increased.

Tile-based edge detection processing in the present exemplary embodiment will be described below. In the following description, each tile contains 16 by 16 pixels.

Tile-based edge detection processing according to a first exemplary embodiment of the present invention will be described below.

Figure 7:
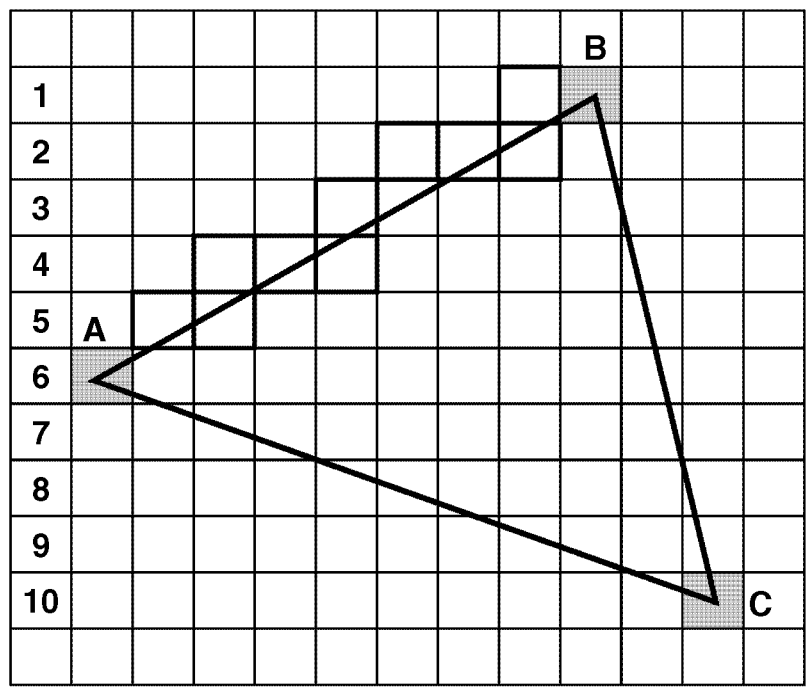
FIG. 7 illustrates tile-based edge detection processing in a first exemplary embodiment of the present invention.

FIG. 7 illustrates the outline of the tile-based edge detection processing according to the first exemplary embodiment. Consider a triangle whose vertices are points A, B, and C, as illustrated in FIG. 7. An outlying area of the triangle is included in a range of tiles in the vertical direction (tiles assigned numbers 1 to 10 at a left end). The number of sides of the triangle is three. Therefore, the edge extraction processing unit 13 performs processing for extracting edge information for each of the sides.

In an example illustrated in FIG. 7, edge information is extracted in each of 11 tiles, excluding tiles respectively including the two points A and B, crossing a side AB from the point A to the point B. In each of the 11 tiles, only a straight line (side AB) connecting the point A and the point B crosses a rectangular area of the tile. More specifically, any one of four sides of the tile crosses the straight line connecting the points A and B. At this time, the number of intersections of the tile and the straight line connecting the points A and B is two. In the first exemplary embodiment, the edge extraction processing unit 13 generates edge information (edge data) based on coordinates of the two intersections. While edge extraction processing is performed for each of the other two sides of the triangle illustrated in FIG. 7, i.e., a side AC connecting the points A and C and a side BC connecting the points B and C, a procedure for the edge extraction processing is similar to that for the sides AB. While the two sides (e.g., the side AB and the side AC) can cross the same tile depending on the position of the vertex or the angle of the side, the edge extraction processing in each of the sides is separately performed even in the case so that the tiles are merged, as needed.

FIG. 8 is a flowchart illustrating an example of edge information extraction processing in the first exemplary embodiment. When started, the processing proceeds to step S71.

In step S71, the edge extraction processing unit 13 first makes setting to perform loop processing a number of times corresponding to the number of graphics (objects). A target graphic in the present exemplary embodiment is only a graphic having three or four sides (i.e., a triangle or a square), and is distinguished from other graphics by processing in the classification unit 12. In step S72, the edge extraction processing unit 13 makes setting to perform loop processing a number of times corresponding to the number of paths (three or four sides) of one object to be subjected to edge extraction processing. In step S73, the edge extraction processing unit 13 makes setting to find the number of tiles in a target path (side) (tiles that the target path crosses) in a rendering space by calculation and perform loop processing a number of times corresponding to the number of the tiles.

In step S74, the edge extraction processing unit 13 uniquely searches, based on a combination of data at two intersections of the target path (side) and sides of the tiles in the rendering space, a database for data, to acquire edge information (edge data) in each of the tiles. The database will be described below. In step S75, the edge extraction processing unit 13 registers (sets) the edge information acquired in step S74 as data on the tile. The processes in steps S74 and S75 are repeated a number of times corresponding to the number of tiles in the target path (side). In steps S76 and S77, the edge extraction processing unit 13 performs loop processing a required number of times, to extract edge information relating to all the graphics (objects).

When the processes are performed along the flowchart illustrated in FIG. 8, as described above, tile data are generated independently for each graphic (in a circumscribed rectangular unit). If a considerable number of tile data are generated, tiles represented by the tile data are timely merged (combined). If the tiles represented by the tile data are merged, a page is sectioned in units of bands (e.g., one band=a fixed width of 160 lines). The processes are sequentially performed while only bands to be processed (bands where tiles exist at this time point) are selected from the top to the bottom of the page. The tiles generated at the time point where combining processing is started are combined while selecting the tiles existing in the bands, as needed. All objects corresponding to one page are finally processed, so that all the tile data are stored in a spooler (temporary storage area) (not illustrated). Contour information (edge information) relating to the graphic, a drawing color, and so on are recorded on the stored tile data corresponding to one page. Drawing processing (pixel output) is performed for a video frame or the like while timely referring to the information. A pixel rasterization processing unit (not illustrated) performs the drawing processing.

Figure 9A:
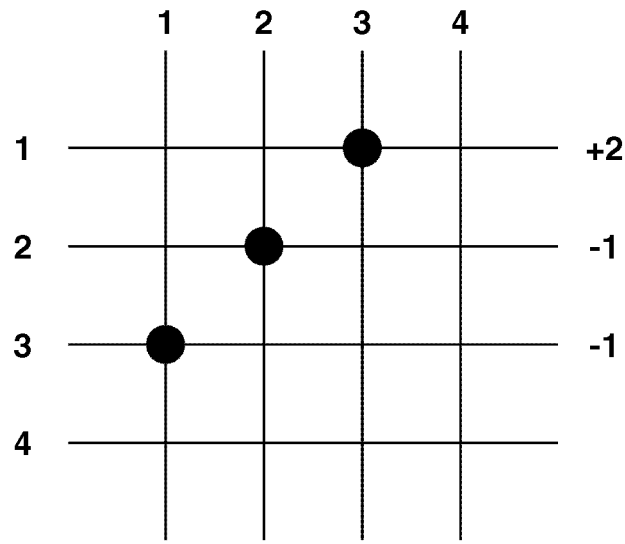
FIGS. 9A and 9B illustrate a data structure storing edge information in the first exemplary embodiment.
Figure 9B:
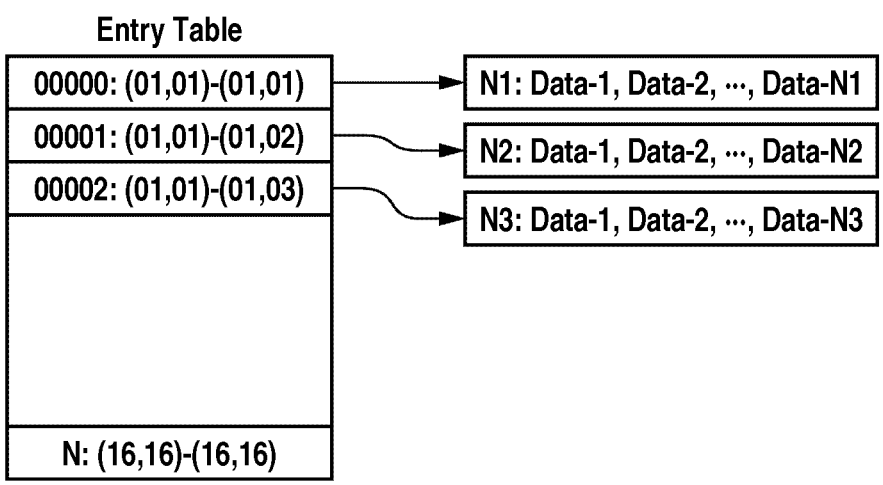

FIGS. 9A and 9B illustrate a database to be referred to in step S74 illustrated in FIG. 8. As described above, the present exemplary embodiment is based on the premise that a tile contains 16 by 16 pixels. Considering a rectangular tile containing 16 by 16 pixels, a straight line crossing the rectangular tile has a finite number of patterns. All the patterns can be represented by combinations of intersections of sides of the rectangular tile and the straight line. Consider a straight line slightly crossing the rectangular tile diagonally at an angle of 45 degrees at its upper left (the straight line is represented by three pixels) by way of example. FIG. 9A illustrates how the straight line crosses the tile, illustrating only the upper left of the tile. The straight line crossing the tile penetrates the tile from its lower left point to upper right point in FIG. 9A. In this example, coordinates at a lower left intersection and coordinates at an upper right intersection are (3, 1) and (1, 3), respectively.

At this time, the number of edges (boundaries) existing in the tile is three when considered in units of scan lines (in the horizontal direction). The edge is represented by an offset value with an uppermost left point of the tile as its reference. In the example illustrated in FIG. 9A, "+2" described at the right represents an offset value. The edge in the next scan line is represented as a relative value (relative offset value) to the edge in the current scan line (a position at the value "+2"). The edge is defined to take a minus value when it exists at the left and take a plus value when it exists at the right. In the example illustrated in FIG. 9A, the edges exist at the left, so that a data string of "−1" and "−1" is obtained.

A straight line crossing a tile has a finite number of patterns. In the case of a tile containing 16 pixels in width by 16 pixels in height, the number of combinations of intersections of a straight line crossing the tile at two points and sides of a rectangle constituting the tile is 2944 (=16 ×(16+15+15)×4).

In the present exemplary embodiment, a database storing edge information is constructed as illustrated in FIG. 9B. An entry table illustrated in FIG. 9B has 2994 entries corresponding to combinations of a straight line crossing a tile containing 16 by 16 pixels and sides of a rectangle constituting the tile. An array table storing edge information according to each of the cases exists subsequent to the entry table. Edge information can be obtained via the entry table. The edge information is represented by a data string serving as a collection of offset values described in FIG. 9A.

As described above, in the first exemplary embodiment, a simple graphic having three or four sides is subjected to tile-based edge detection processing. More specifically, the edge extraction processing unit 13 puts a side of an input graphic on coordinates on a tile and then finds intersections of the side of the graphic and sides of a rectangle constituting the tile. Based on a combination of coordinate data at the found intersections, the database is searched for corresponding edge information, to generate the edge information. This enables an operation amount in generating the edge information to be efficiently suppressed, thereby enabling a processing speed to be effectively improved.

A second exemplary embodiment of the present invention will be described below.

In the above-mentioned first exemplary embodiment, it is checked what is a graphic (an object) input by the graphic type determination processing in the classification unit 12, and tile-based edge extraction processing is performed if the graphic is a triangle or a square as a result of the check.

In the second exemplary embodiment, "graphic type identification information" representing a graphic type is added to each of graphics (objects), to enable tile-based edge extraction processing to be also performed for other graphics (graphics bounded by straight lines) such as a star shape. Further, a processing procedure (algorithm) is individually prepared for the graphics that can be processed at higher speed by using characteristics (e.g., symmetry) of the graphics. Edge information is generated by the best processing procedure for each of the graphics.

Figure 10:
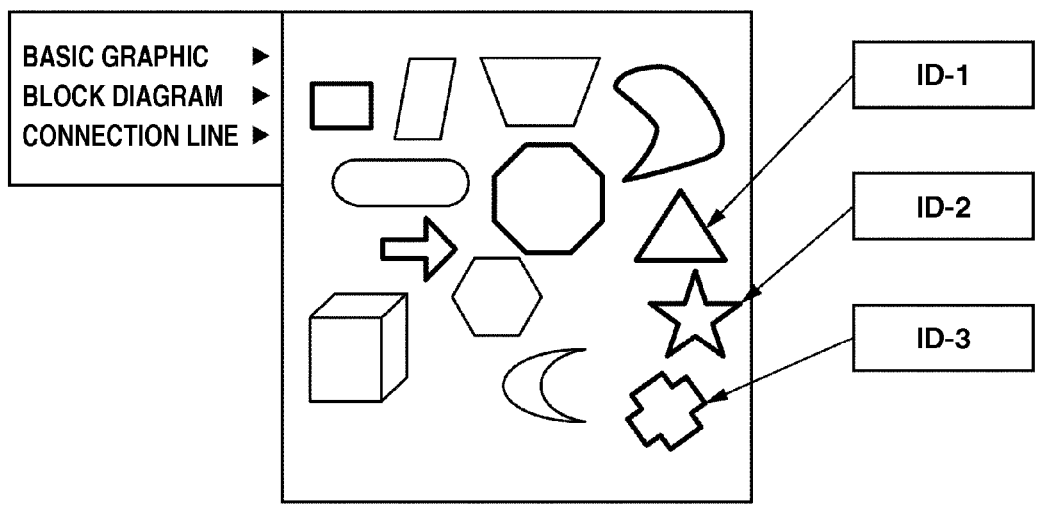
FIG. 10 illustrates graphic type identification information in a second exemplary embodiment of the present invention.

In application software for handling graphics, as illustrated in FIG. 10, a graphic type (e.g., a triangle, a square, a trapezoid, or a parallelogram) to be inserted into a document can be selected from a pull-down menu or the like. "Graphic type identification information" representing a graphic type is assigned to each of the graphics from the application software so that the graphic type identification information is added to each of data representing graphics in a print job. In an example illustrated in FIG. 10, ID-1 is assigned as the graphic type identification information to the triangle. Similarly, ID-2 and ID-3 are respectively assigned to a star shape and a cross-shaped polygon that has been rotated.

Figure 11:
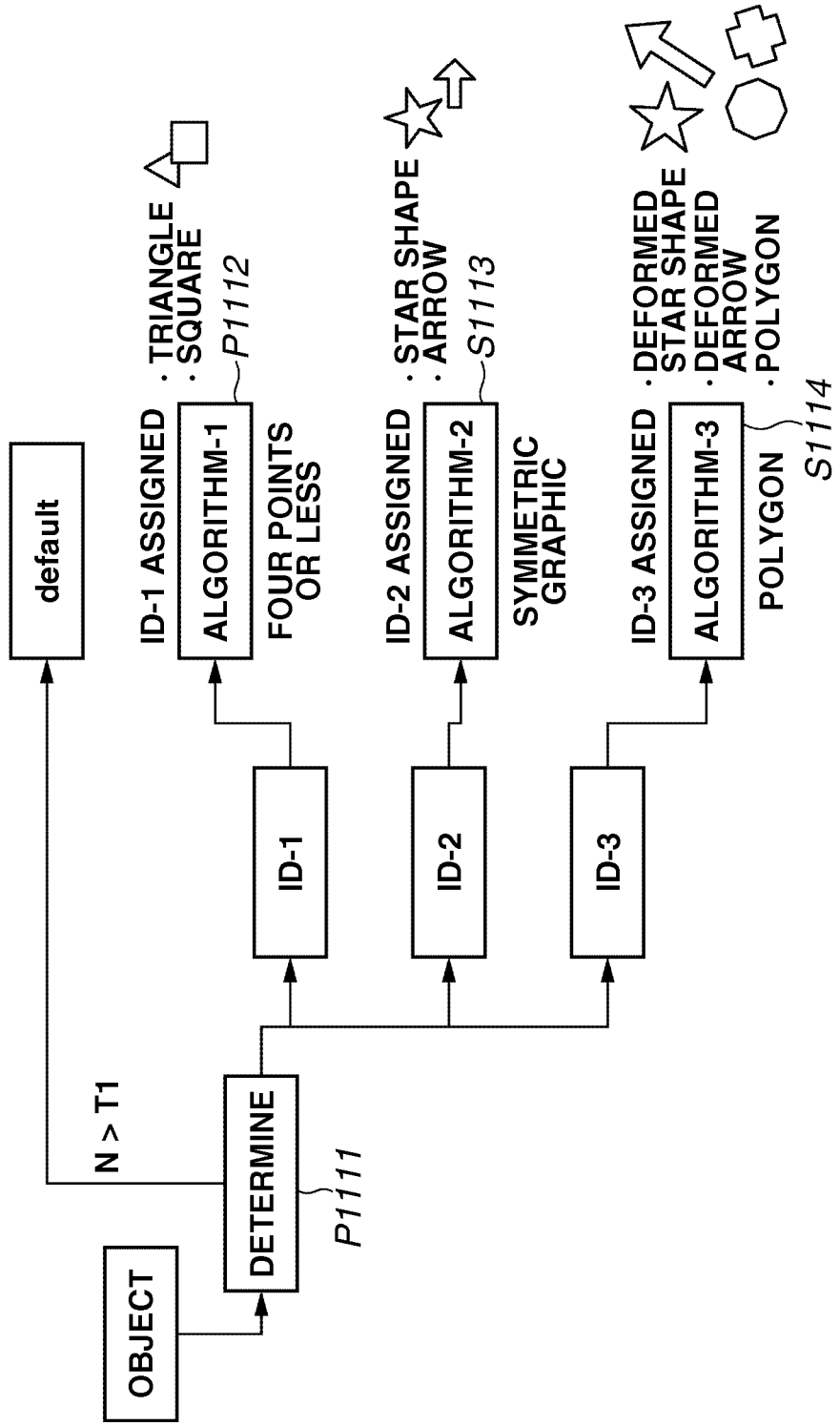
FIG. 11 illustrates the flow of edge information extraction processing in the second exemplary embodiment.

FIG. 11 illustrates the flow of edge information extraction processing in the second exemplary embodiment. First, an edge extraction processing unit 13 calculates, when an object (graphic) is input, a total number N of objects (graphics) input by a counter (not illustrated). In step P1111, the edge extraction processing unit 13 compares the calculated total number N and a previously set threshold value T1 sequentially when the object (graphic) is input or at the time point where all the graphics in one page (or in a predetermined processing unit) have been input. If the total number N of objects is larger than the threshold value T1 (N>T1) as a result of the comparison, the edge extraction processing unit 13 performs the above-mentioned scan-line edge detection processing (see FIG. 2), to generate edge information.

On the other hand, if the total number N of objects is the threshold value T1 or less (N≤T1), the edge extraction processing unit 13 switches a processing method according to graphic type identification information added to each of the objects (graphics) to perform tile-based edge detection processing, to generate edge information.

If the graphic type identification information is ID-1, for example, the edge extraction processing unit 13 performs processing for a triangle, to perform edge information extraction processing in a processing procedure similar to that in the first exemplary embodiment. For a graphic to which ID-2 is assigned as graphic type identification information (e.g., a star shape in the present exemplary embodiment), the edge extraction processing unit 13 performs edge information extraction processing in a processing procedure different from that for the triangle. A processing procedure (algorithm) for the graphic to which ID-2 is assigned as graphic type identification information is suitable for a graphic having symmetry with respect to a horizontal axis or a vertical axis. The details of the processing will be described below. For a graphic to which ID-3 is assigned as graphic type identification information (e.g., a polygon that has been rotated and deformed), the edge extraction processing unit 13 performs edge information extraction processing in a processing procedure different from that for the triangle (assigned ID-1) and the graphic having symmetry (assigned ID-2). The details of the processing procedure (algorithm) for the graphic to which ID-3 is assigned as the graphic type identification information will be described below.

Edge information extraction processing for a graphic to which ID-2 is assigned as graphic type identification information in the second exemplary embodiment will be described below.

Figure 12:
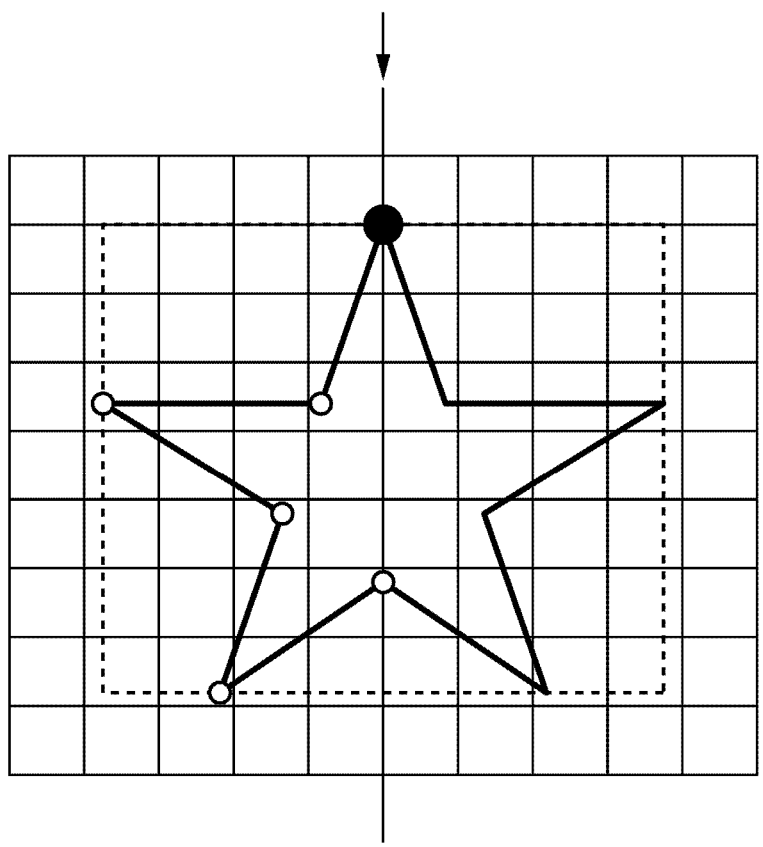
FIG. 12 illustrates an example of a graphic (assigned ID-2) in the second exemplary embodiment.

FIG. 12 illustrates an example of a graphic to which ID-2 is assigned as graphic type identification information, illustrating a star shape as an example. The shape (contour) of a star graphic is line-symmetric with respect to a vertical center axis. When the graphic is line-symmetric, and a symmetric axis is horizontal or vertical, edge information extraction processing is performed for only the contour of the graphic on one side of the symmetric axis. For the contour of the graphic on the other side of the symmetric axis, edge data obtained by the edge information extraction processing for the contour on the one side is reversed so that the remaining edge data can be generated.

In order to efficiently execute the processing, a tile boundary line used in rendering processing and the symmetric axis of the graphic are to be matched with each other. A coordinate position to be rendered of an object to be drawn is originally designated. Further, a positional relationship between coordinates to be rendered and tiles is independently determined. Therefore, the symmetric axis of the graphic and the tile boundary line are not generally matched with each other. In order to match them, a coordinate position of the graphic is temporarily transferred onto a relative coordinate space to perform edge information extraction processing, and is then moved again to its original coordinates in the present exemplary embodiment.

Figure 13:
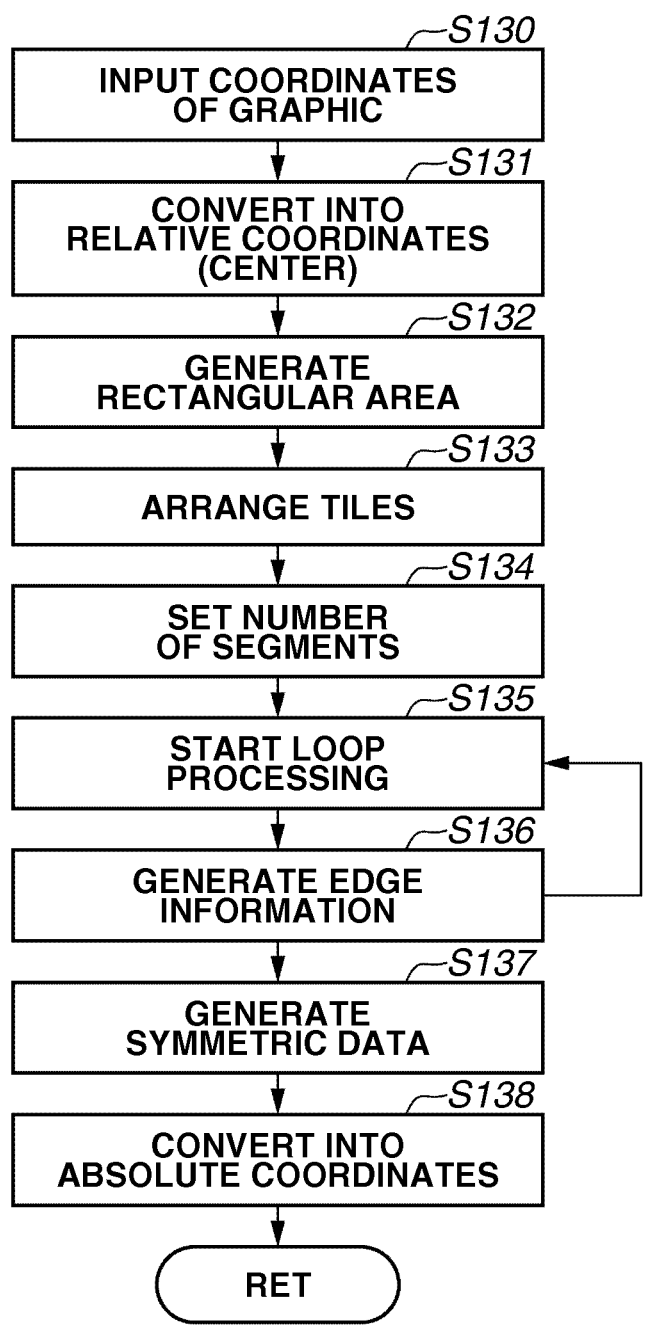
FIG. 13 is a flowchart illustrating an example of edge information extraction processing in the second exemplary embodiment.

FIG. 13 is a flowchart illustrating an example of edge information extraction processing for a graphic to which ID-2 is assigned as graphic type identification information in the second exemplary embodiment.

In step S130, the edge extraction processing unit 13 inputs coordinates of the graphic. In step S131, the edge extraction processing unit 13 converts the input coordinates into coordinate data in a relative coordinate space. The relative coordinate space is constructed to match a central axis of a target object (a center line indicated by an arrow in FIG. 12 if the graphic is a star shape) with a tile boundary line. For example, an intersection of a central axis of a graphic and an outlying line (an uppermost vertex in FIG. 12, for example, if the graphic is a star shape) is matched with any one of four vertices of a rectangle constituting a tile (a point at which a vertical line and a horizontal line representing the tile boundary cross each other).

In step S132, the edge extraction processing unit 13 then generates a rectangular area surrounding the target object. In step S133, the edge extraction processing unit 13 arranges tiles in an area including the rectangular area so that the rectangular area is included therein. Edge detection processing is performed, out of sides of the target object (referred to as segments), for the segments on one side of the central axis. In step S134, the edge extraction processing unit 13 counts the number of the sides of the target object (counts and sets the total number of the segments).

In step S135, the edge extraction processing unit 13 starts loop processing. In step S136, the edge extraction processing unit 13 extracts edge information relating to the sides set in step S134. The edge extraction processing unit 13 performs the loop processing a number of times corresponding to the number of the set sides, to sequentially extract edge information relating to the sides. In the process in step S136, the edge information is generated from information relating to an intersection of each of the sides and the tile boundary, like in the process in the first exemplary embodiment. After a series of loop processing, described above, the edge information has been extracted for the segments on one side of the central axis.

In step S137, the edge extraction processing unit 13 generates edge information on the other side of the central axis based on the edge information on the one side thereof. In step S138, the edge extraction processing unit 13 returns the edge information relating to the target object to an absolute coordinate system (an original coordinate position), to complete the processing.

Edge information extraction processing for a graphic to which ID-3 is assigned as graphic type identification information in the second exemplary embodiment will be described below.

Figure 14:
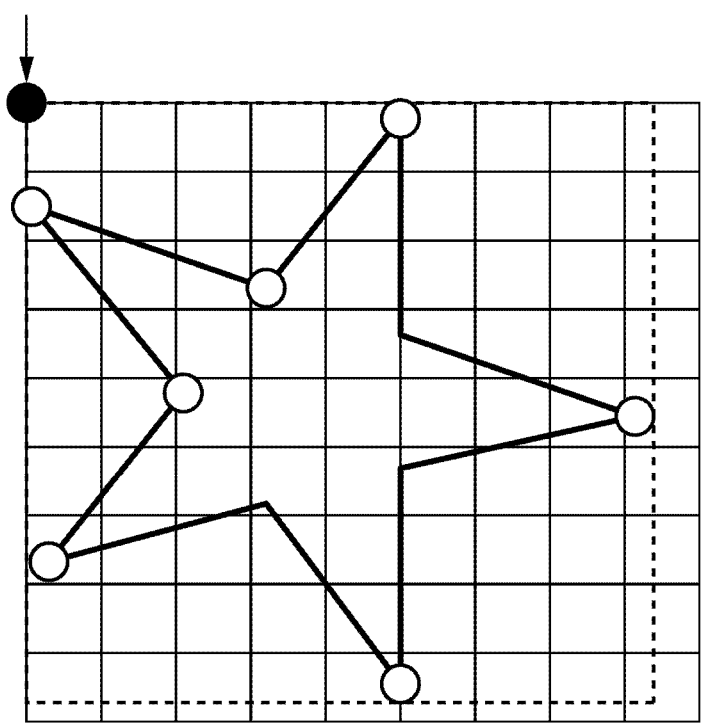
FIG. 14 illustrates an example of a graphic (assigned ID-3) in the second exemplary embodiment.

FIG. 14 illustrates an example of the graphic to which ID-3 is assigned as the graphic type identification information, illustrating a star shape that has been rotated as an example. A star graphic has symmetry. When the star graphic is rotated, as illustrated in FIG. 14, a symmetric axis of the graphic is also rotated. Thus, the symmetric axis of the graphic and a vertical or horizontal line representing a tile boundary are not matched with each other. Therefore, processing for reversing edge data on one side of the symmetric axis to generate edge data on the other side thereof cannot be executed, unlike the above-mentioned processing for the graphic to which ID-2 is assigned as the graphic type identification information. For the graphic to which ID-3 is assigned as the graphic type identification information, therefore, the edge extraction processing unit 13 sequentially generates edge information relating to all contours (edges) constituting the graphic.

More specifically, a coordinate position of a graphic is mapped onto a relative coordinate space to extract an edge of a graphic, to execute edge information extraction processing, and is then moved again to its original coordinates. In the mapping onto the relative coordinate space, a circumscribed rectangle surrounding a target object (a star shape that is rotated in this example) and having sides parallel to a horizontal axis and sides parallel to a vertical axis in the relative coordinate space is generated. An upper left vertex of the circumscribed rectangle is matched with any one of four vertices of a rectangle constituting a tile (a point at which a vertical line and a horizontal line representing a tile boundary cross each other).

Figure 15:
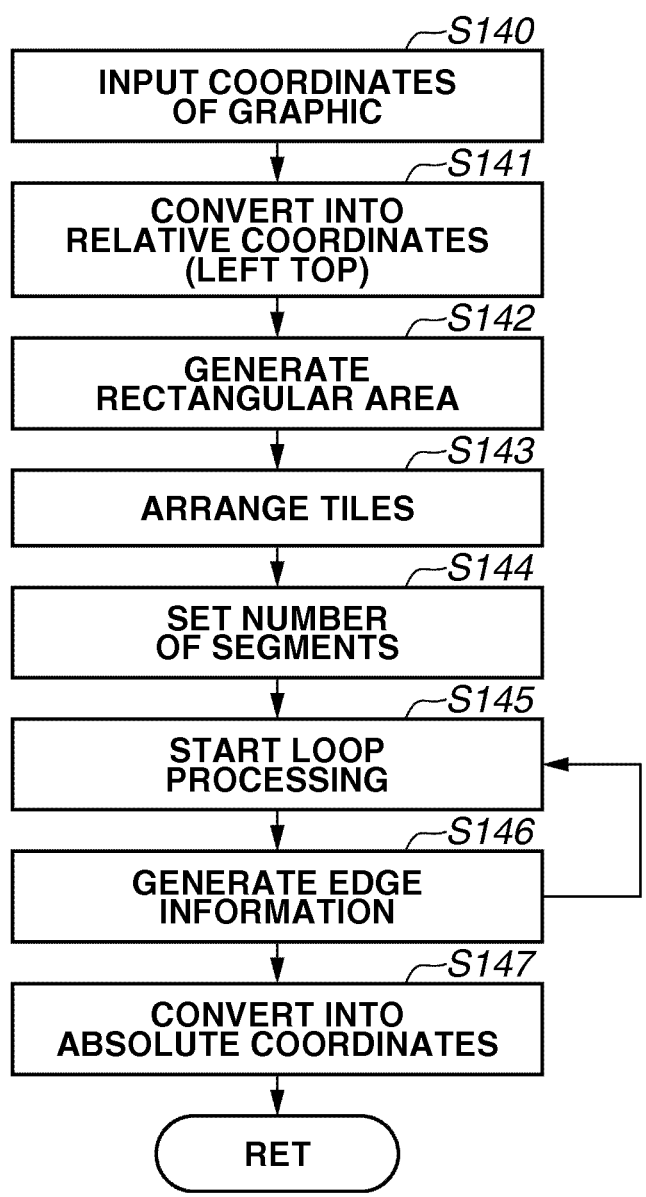
FIG. 15 is a flowchart illustrating an example of edge information extraction processing in the second exemplary embodiment.

FIG. 15 is a flowchart illustrating an example of edge information extraction processing relating to a graphic to which ID-3 is assigned as graphic type identification information in the second exemplary embodiment.

In step S140, the edge extraction processing unit 13 inputs coordinates of the graphic. In step S141, the edge extraction processing unit 13 converts the input coordinates into coordinate data in a relative coordinate space. The relative coordinate space is composed of tiles, and is constructed to match an upper left vertex of a rectangle circumscribed around the graphic and having sides parallel to a horizontal axis and sides parallel to a vertical axis in the relative coordinate space with any point at which a vertical line and a horizontal line representing a tile boundary cross each other.

In step S142, the edge extraction processing unit 13 then generates a rectangular area surrounding the target object. In step S143, the edge extraction processing unit 13 arranges tiles for an area including the rectangular area so that the rectangular area is included therein. In step S144, the edge extraction processing unit 13 then counts the number of sides of the target object (referred to as segments) (counts and sets the total number of segments).

In step S145, the edge extraction processing unit 13 starts loop processing. In step S146, the edge extraction processing unit 13 extracts edge information relating to the sides set in step S144. The edge extraction processing unit 13 performs the loop processing a number of times corresponding to the number of the sides, to sequentially extract edge information relating to the sides. In the process in step S146, the edge information is generated from information relating to an intersection of each of the sides and the tile boundary, like in the process in the first exemplary embodiment.

In step S147, the edge extraction processing unit 13 finally returns the edge information relating to the target object to an absolute coordinate system (an original coordinate position), to complete the processing.

Figure 16:
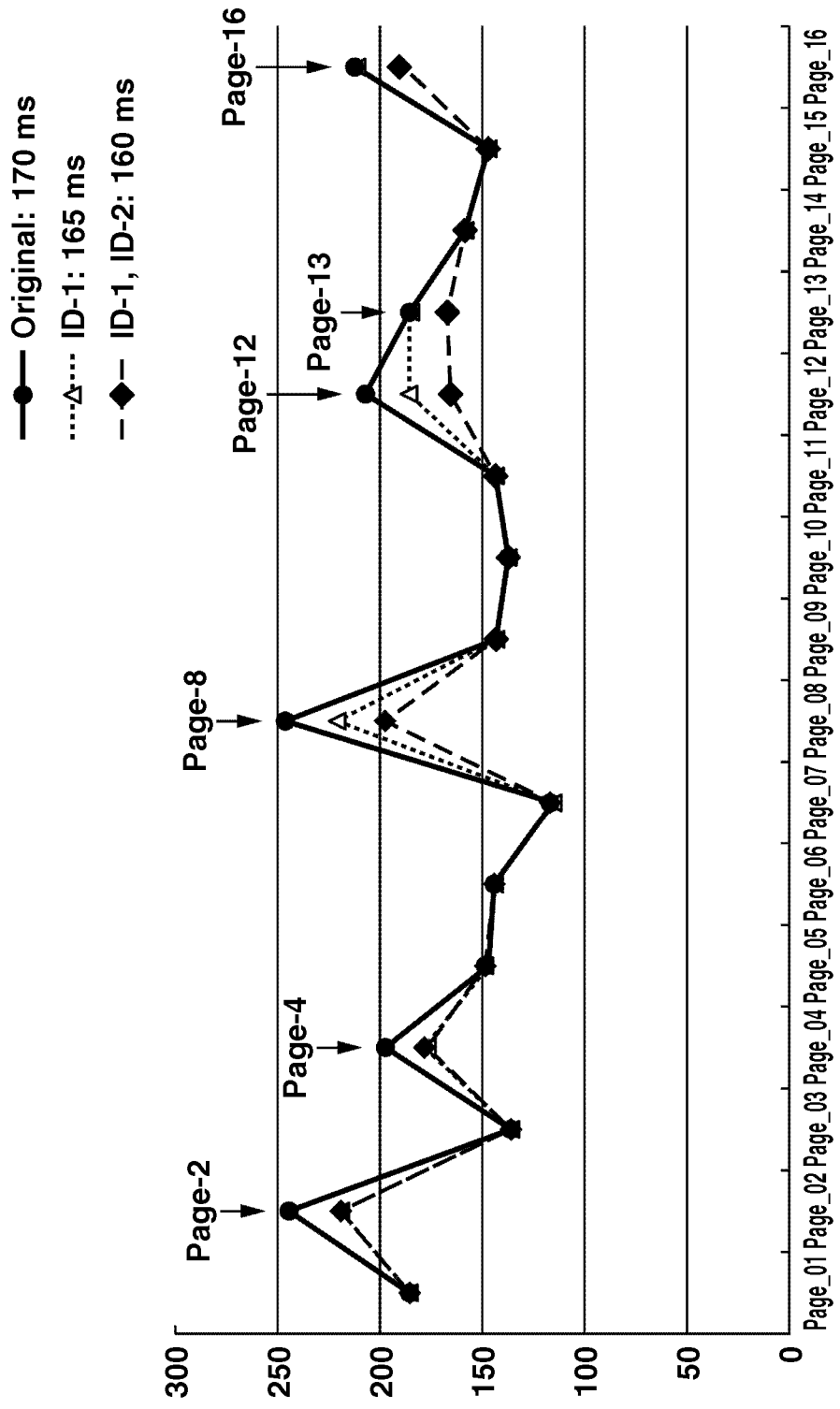
FIG. 16 illustrates an example of a processing time in the second exemplary embodiment.

FIG. 16 is a graph illustrating an example of a distribution of a processing time in each page in a print job in the second exemplary embodiment. FIG. 16 plots a job page (first to sixteen pages) as the abscissa and a processing time (milliseconds) in each of the pages as the ordinates. In FIG. 16, each polygonal line data indicates a change in an edge processing time. A solid line indicates a processing time consumed when only scan-line edge detection processing is executed. An average processing speed over the whole job is 170 milliseconds. On the other hand, a dotted line indicates a processing time consumed when tile-based edge detection processing is performed only for a triangle out of input graphics and scan-line edge detection processing is performed for the other graphics. As can be seen from the dotted line illustrated in FIG. 16, higher speed is achieved by processing in the second, fourth, eighth, and twelfth pages. The average processing speed over the whole job is 165 milliseconds. Further, a broken line indicates a processing time consumed when tile-based edge detection processing is performed for a triangle (a graphic assigned ID-1) and a star shape (a symmetric graphic assigned ID-2) out of the input graphics and scan-line edge detection processing is performed for the other graphics. As can be seen from the broken line illustrated in FIG. 16, higher speed is achieved by processing in the eighth, twelfth, thirteenth, and sixteenth pages. The average processing speed over the whole job is 160 milliseconds.

As described above, in the second exemplary embodiment, optimum processing methods are respectively prepared for a variety of graphics included in the job, and are suitably switched according to the graphics to execute each processing so that the whole throughput can be improved.

The speed of the edge information generation processing can be increased by applying the processes in the first and second exemplary embodiments, as described above. In either case, the tile-based edge detection processing is used for increasing the speed of the processing. However, it is considered that these results are obtained under the condition that the number of objects is small, as described above. Conversely, when the number of objects is significantly large, the tile-based edge detection processing may be considered later than the scan-line edge detection processing. When the print job is generated, application software may not deal with addition of graphic type identification information for determining a graphic type for each object.

In a third exemplary embodiment of the present invention, change characteristics of a speed (a processing time) in each algorithm that changes according to the number of objects are recorded in a characteristic database (characteristic DB) storing characteristic information. For example, a change characteristic of a processing speed (e.g., information relating to the number of objects in which the processing speed is reversed) in each of algorithms (a scan-line algorithm and a tile-based algorithm) is recorded in the characteristic DB. Processing is switched based on the information recorded in the characteristic DB. Even when not added from application software, graphic type identification information can be added, as needed, by analyzing graphic data in a printer driver.

FIGS. 17A to 17C are graphs illustrating a speed characteristic of edge information extraction processing in each of the algorithms, and plot the number of objects as the abscissa and a processing time as the ordinate. In both scan-line processing and tile-based processing, as the number of objects increases, the processing time tends to increase. FIG. 17A illustrates a characteristic in the scan-line processing, and FIG. 17B illustrates a characteristic in the tile-based processing (the above-mentioned edge detection processing in the first exemplary embodiment). FIG. 17C illustrates a characteristic in hybrid processing using both the scan-line processing and the tile-based processing. A difference among the characteristics illustrated in FIGS. 17A to 17C will be described in detail below.

As illustrated in FIG. 17A, in the scan-line processing, a processing speed is low in an area A (an area where the number of objects is small). When the number of objects increases, however, a decrease in the processing speed with an increase in the number of objects is suppressed in an area B (an area where the number of objects is large). This is conceivably affected by an improvement in the efficiency of loop processing, for example, in a case where a large number of graphics cross one scan line.

On the other hand, as illustrated in FIG. 17B, in the tile-based processing, a processing speed is high in an area A (an area where the number of objects is small). When the number of objects increases, however, the processing speed significantly decreases in an area B (an area where the number of objects is large). This is conceivably affected by an increase in the number of processing steps in proportion to the number of graphics, for example, because the tile-based processing is performed independently for each of the objects.

As described above, the scan-line processing and the tile-based processing respectively have opposite characteristics in the areas A and B. The advantages of the scan-line processing and the tile-based processing can be respectively elicited by inspecting the characteristics thereof to acquire the number of objects in which the processing speed is reversed and switching the processing in the number of objects. FIG. 17C illustrates characteristics in switching processing at a branch point (in the number of objects in which the processing speed is reversed) so that the tile-based processing is performed in the area A and the scan-line processing is performed in the area B.

The change characteristic of the processing speed (processing time) corresponding to the number of objects depends on each of the processing procedures (algorithms) so that the characteristic is to be grasped for the processing procedure. In the second exemplary embodiment, the graphic to which ID-2 is assigned and the graphic to which ID-3 is assigned as the graphic type identification information have respective different characteristics, and differ in points (branch points) at which the respective speeds of the scan-line processing and the tile-based processing are reversed.

A graphic size also affects the change characteristic of the processing time. In the first exemplary embodiment, tile data are sequentially generated for each graphic. If a considerable number of tile data are generated, tiles represented by the tile data are timely merged (combined), as described in FIG. 8. When the tiles are processed, a page is sectioned in units of fixed section widths (a band width: one band=160 lines, for example). The first exemplary embodiment is based on the premise that a large number of graphics fall within the fixed section width (e.g., 160 lines). However, it is also considered that a graphic size to be designated is not limited, and the average size exceeds a previously set section width. The increase in the graphic size particularly affects a characteristic of scan-line edge detection processing. This is a great factor that affects the characteristic of the edge detection processing (a change at a branch point). Thus, it is desirable that a difference in the graphic size is also considered as a more suitable exemplary embodiment of the present invention. In the third exemplary embodiment, two section widths (160 lines and 320 lines) are prepared, and are switched, as needed, according to the average graphic size.

Figure 18:
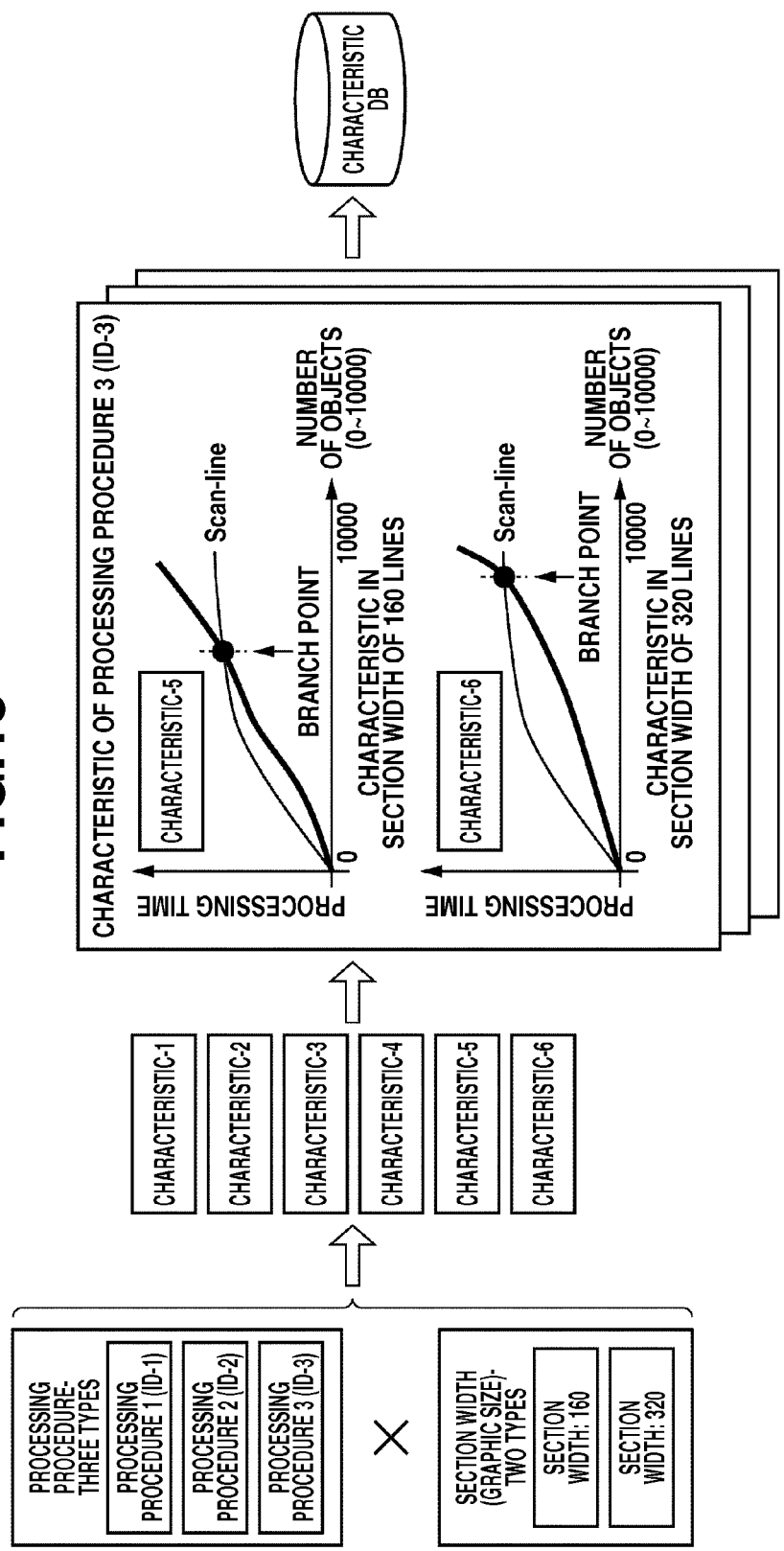
FIG. 18 illustrates an example of data stored in a characteristic database in a third exemplary embodiment of the present invention.

Therefore, characteristics to be measured in the edge information extraction processing in the third exemplary embodiment include combinations (a total of six types of characteristics) of types of algorithms (three types in the present exemplary embodiment) and types of graphic sizes (two types in the present exemplary embodiment), as illustrated in FIG. 18. Information relating to the measured characteristics is stored in the characteristic DB, to switch the processing based on the stored information. FIG. 18 illustrates characteristic data (six types) stored in the characteristic DB used in the third exemplary embodiment.

Figure 19:
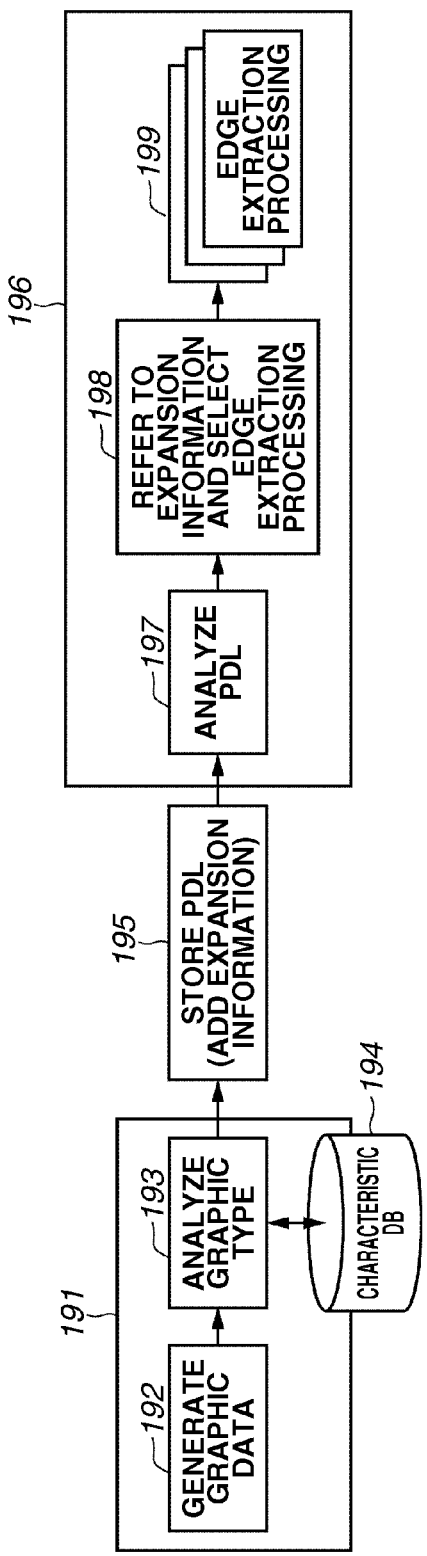
FIG. 19 illustrates an example of a configuration of a print system.

FIG. 19 is a block diagram illustrating an example of a configuration of a print system including a printer driver 191. FIG. 19 illustrates only elementary features. As described at the beginning of the description of the third exemplary embodiment, even when graphic type identification information is not added from application software, the printer driver 191 enables graphic type analysis processing to be executed to deal with switching of processing according to a graphic type. Simple graphics can be classified to some extent from construction and a positional relationship of coordinate points. The execution of the graphic type analysis processing is considered to slightly increase a processing time but has an advantage in consideration of the throughput of the whole print system because the graphic type analysis processing is performed on the side of a high-speed host personal computer (PC).

A characteristic DB 194 storing information relating to a change characteristic of a speed in each processing procedure (algorithm) exists in a module of the printer driver 191. When printing is started by the application software, the printer driver 191 starts to generate a print job based on information output from a graphic data generation unit 192. Simultaneously, a graphic type analysis unit 193 starts to analyze a graphic type of each object (graphic), and adds graphic type identification information to the object (graphic) by accessing the characteristic DB 194 in parallel with the analysis.

A graphic to which ID-1 is assigned as the graphic type identification information is allocated the tile-based edge information extraction processing as described in the first exemplary embodiment. A graphic to which ID-2 is assigned as the graphic type identification information is allocated the tile-based edge information extraction processing in the processing procedure as illustrated in FIG. 13 in the second exemplary embodiment. Further, a graphic to which ID-3 is assigned as the graphic type identification information is allocated the tile-based edge information extraction processing in the processing procedure as illustrated in FIG. 15 in the second exemplary embodiment.

The above-mentioned graphic type identification information ID-1, ID-2, and ID-3 are respectively stored, after expansion information areas (allocated to the objects) in page description language (PDL) data are expanded, as needed, in the expanded expansion information areas. No expansion information exists as a default in the object in the PDL data. Scan-line edge information extraction processing is executed for the object in which the expansion information does not exist.

As described above, the PDL data, to which the graphic type identification information has been added, as needed, is generated from the printer driver 191, and is transferred to a printer apparatus 196 via a functional unit 195 such as a print spooler. In the printer apparatus 196, a PDL analysis unit 197 analyzes data. Image formation processing is started for an object such as a graphic in the PDL data, and edge information relating to the graphic is generated in the processing. At this time, the PDL analysis unit 197 and a functional unit 198 confirm whether expansion information exists in each object. As a result, when the expansion information exists, graphic type identification information (any one of ID-1, ID-2, and ID-3) stored therein is read, and edge extraction processing to be executed is selected based on the read graphic type identification information. An edge extraction processing unit 199 executes processing according to the selected edge extraction processing. A controller in the printer apparatus 196 generates an image based on the extracted edge information, and a print engine in the printer apparatus 196 makes prints on paper based on the generated image.

Referring to FIGS. 20 to 24, other processing relating to each graphic in the third exemplary embodiment will be described below.

Figure 20:
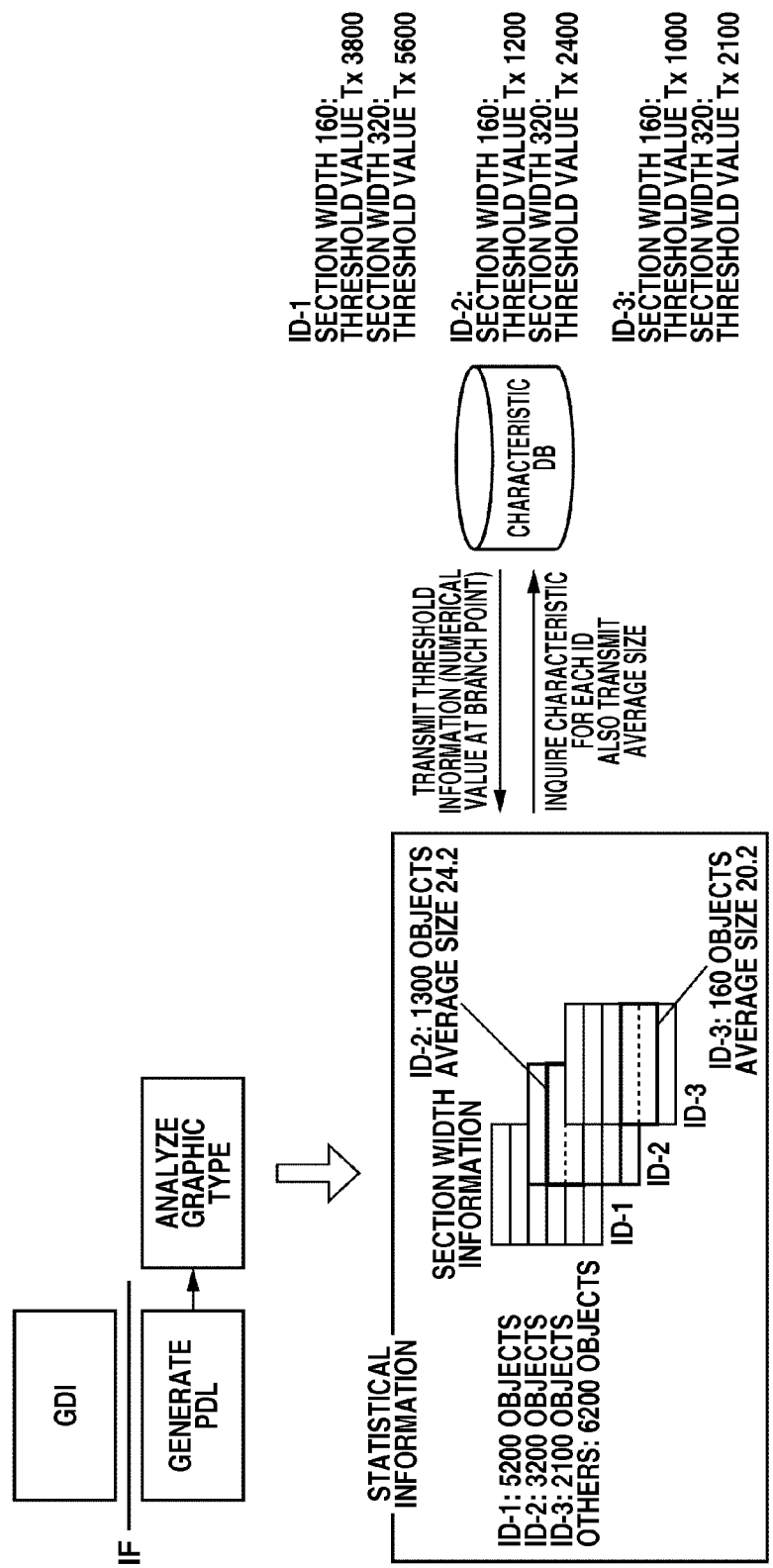
FIG. 20 illustrates processing such as graphic type analysis in the third exemplary embodiment.
Figure 21:
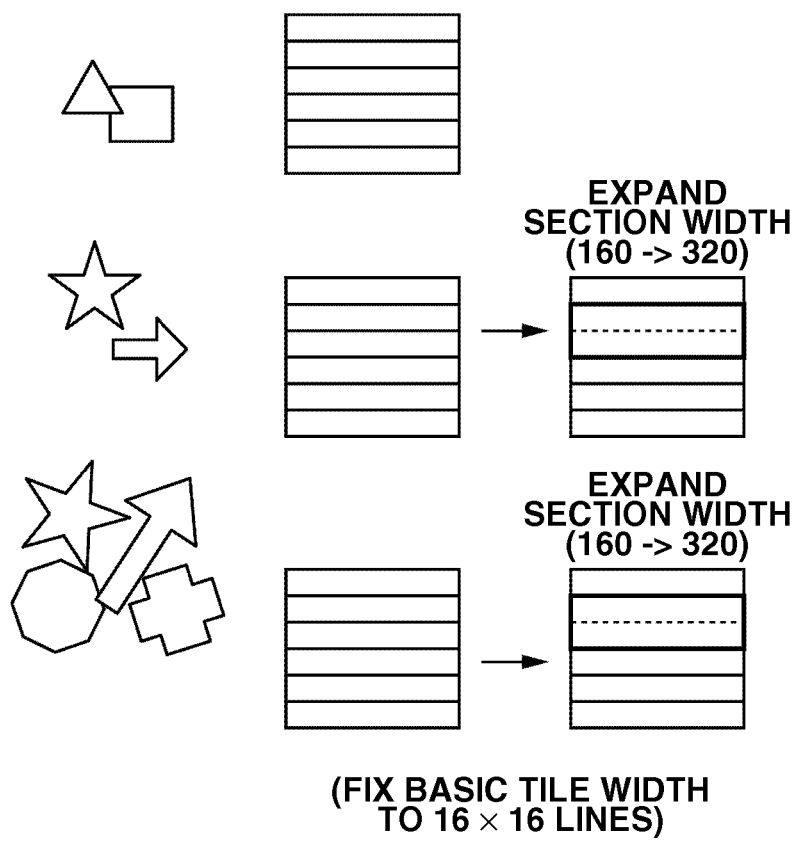
FIG. 21 illustrates section width expansion in the third exemplary embodiment.

FIG. 20 illustrates processing such as graphic type analysis in the third exemplary embodiment. As illustrated in FIG. 20, a PDL is generated based on a drawing instruction from a graphics device interface (GDI) in the printer driver 191. Graphic type analysis processing is performed in the process, so that statistical information relating to a graphic is acquired. The statistical information is counted for each section (each band on a page), and includes the number of types of graphics and the average size of the graphics in the section. The width of a drawing section in the page is 160 lines as a default, as illustrated in FIG. 21. When a large number of great graphics exist in a particular band, and the average size of the graphics is greater than 160 lines. However, the section width is expanded. In the third exemplary embodiment, the section width is 320 lines when expanded. The average size is measured for each graphic type. Therefore, information relating to the section width is managed independently for each graphic type.

Description is made using an example illustrated in FIG. 20. It is assumed that the number of objects assigned ID-1 is 5200, the number of objects assigned ID-2 is 3200, the number of objects assigned ID-3 is 2100, and the number of other objects is 6200 as statistical information acquired when a job is analyzed. When the section width of a section is observed for each identification (ID), the section is partially expanded in the object assigned ID-2 and the object assigned ID-3. In statistical information, when the number of objects (graphics) assigned ID-2 is 1300 in a certain section (band), and the average size of the objects is 242, for example, the section is expanded, and the section width is 320 lines. Information relating to the average size is also used to inquire of the characteristic DB the characteristic of the objects assigned ID-2 (information at a branch point=a threshold value Tx in the characteristic DB). In the characteristic DB in the example illustrated in FIG. 20, a threshold value in a section width of 320 lines in the characteristic of the objects assigned ID-2 is 2400. When edge information extraction processing is performed for the graphics assigned ID-2 distributed in the section width of 320 lines, therefore, it is determined that tile-based edge information extraction processing described in the second exemplary embodiment should be executed.

Figure 22:
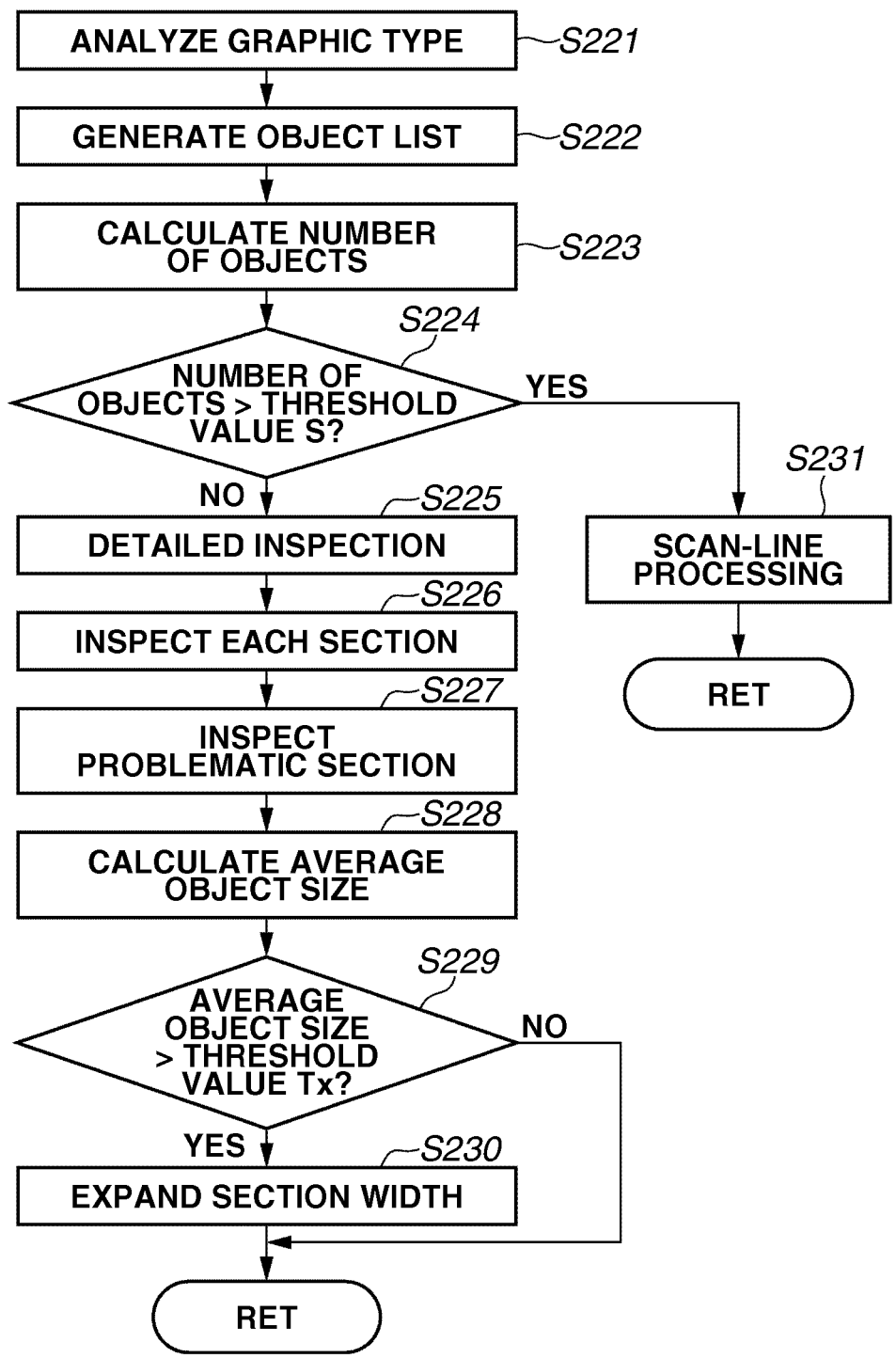
FIG. 22 is a flowchart illustrating an example of processing such as graphic type analysis in the third exemplary embodiment.

FIG. 22 is a flowchart illustrating an example of processing such as graphic type analysis in the third exemplary embodiment. In step S221, the graphic type analysis unit 193 starts to analyze a graphic type, and performs initialization processing or the like. In step S222, the graphic type analysis unit 193 generates an object list, and stores object data such as path information, a coordinate value, or a text code in graphics upon receipt of information relating to a PDL. In step S223, the graphic type analysis unit 193 calculates the number of objects N in a processing unit (processing page) (counts the total number of objects N).

In step S224, the graphic type analysis unit 193 compares the number of objects N with a threshold value S. If the number of objects N is larger than the threshold value S as a result of the comparison (YES in step S224), the processing proceeds to step S231. In step S231, the graphic type analysis unit 193 executes scan-line edge extraction processing, and the processing then returns to a calling module. On the other hand, if the number of objects N is the threshold value S or less (NO in step S224), the processing proceeds to step S225. In step S225, the graphic type analysis unit 193 starts detailed inspection.

In step S226, the graphic type analysis unit 193 inspects each section. In step S227, the graphic type analysis unit 193 calculates an average object size of graphics existing in a problematic section (meaning a section (band) in which a large number of objects exist). Examples of each object size include the length of the long side of a circumscribed rectangle. An average object size in a certain section is an average value of the sizes of objects. In step S228, the graphic type analysis unit 193 calculates an average object size of graphics existing in each section (band). A method for calculating the average object size of the graphics existing in the section will be described below with reference to FIG. 23.

In step S229, the graphic type analysis unit 193 compares the calculated average object size in the section with a threshold value Tx. If the average object size is greater than the threshold value Tx (YES in step S229), the processing proceeds to step S230. In step S230, the graphic type analysis unit 193 expands the section width of the section. The threshold value Tx is acquired from the characteristic DB, for example. On the other hand, if the average object size is the threshold value Tx or less as a result of the comparison (NO in step S229), the graphic type analysis unit 193 does not expand the section width, and the processing then returns to the calling module.

Figure 23:
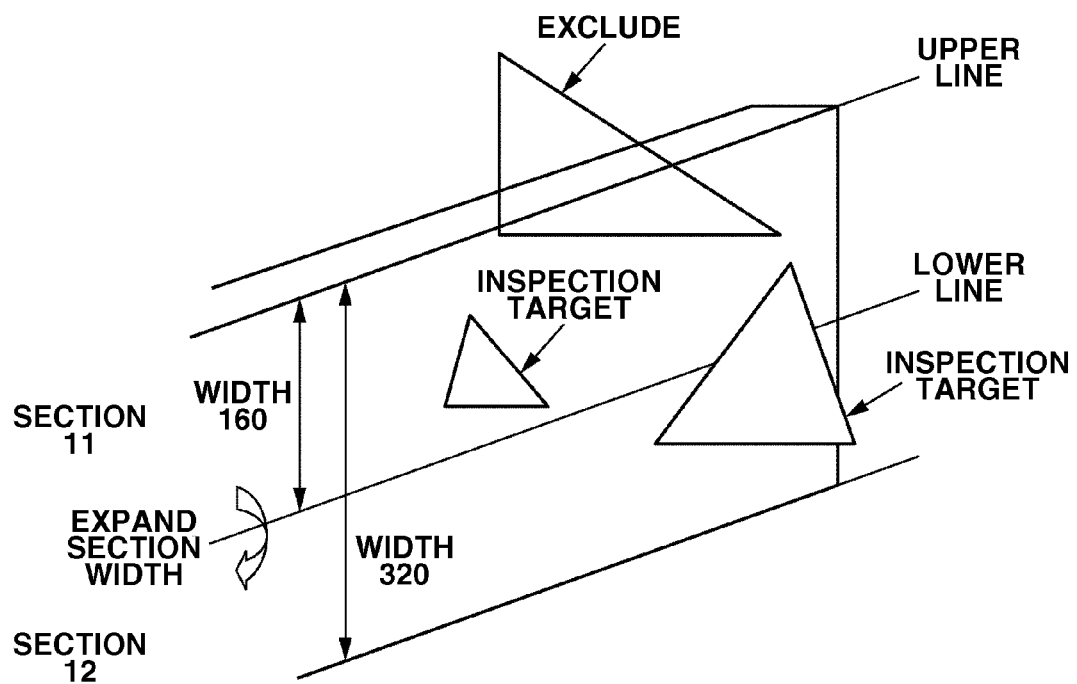
FIG. 23 illustrates an object within a section width in the third exemplary embodiment.

FIG. 23 illustrates how a section width is expanded. In FIG. 23, a section 11 is a current inspection target section. The section 11 is sandwiched between an upper line and a lower line, and the width thereof is defined to 160 lines as an initial value. In this example, it is determined that the average size of graphics associated with the section 11 exceeds a width of 160 lines when calculated. Therefore, the width of the section 11 is expanded to 320 lines. At this time, the section 11 overrides a section 12. As a result, sections in a page are defined as sections 1, 2, . . . , 10, 11, and 13. In FIG. 23, an object to be an inspection target is a graphic existing in the section 11 and a graphic crossing the lower line in the section 11. A graphic crossing the upper line in the section 11 is exempt from the inspection target. An average object size in each of the sections on the page is uniquely calculated according to this definition (rule).

Figure 24:
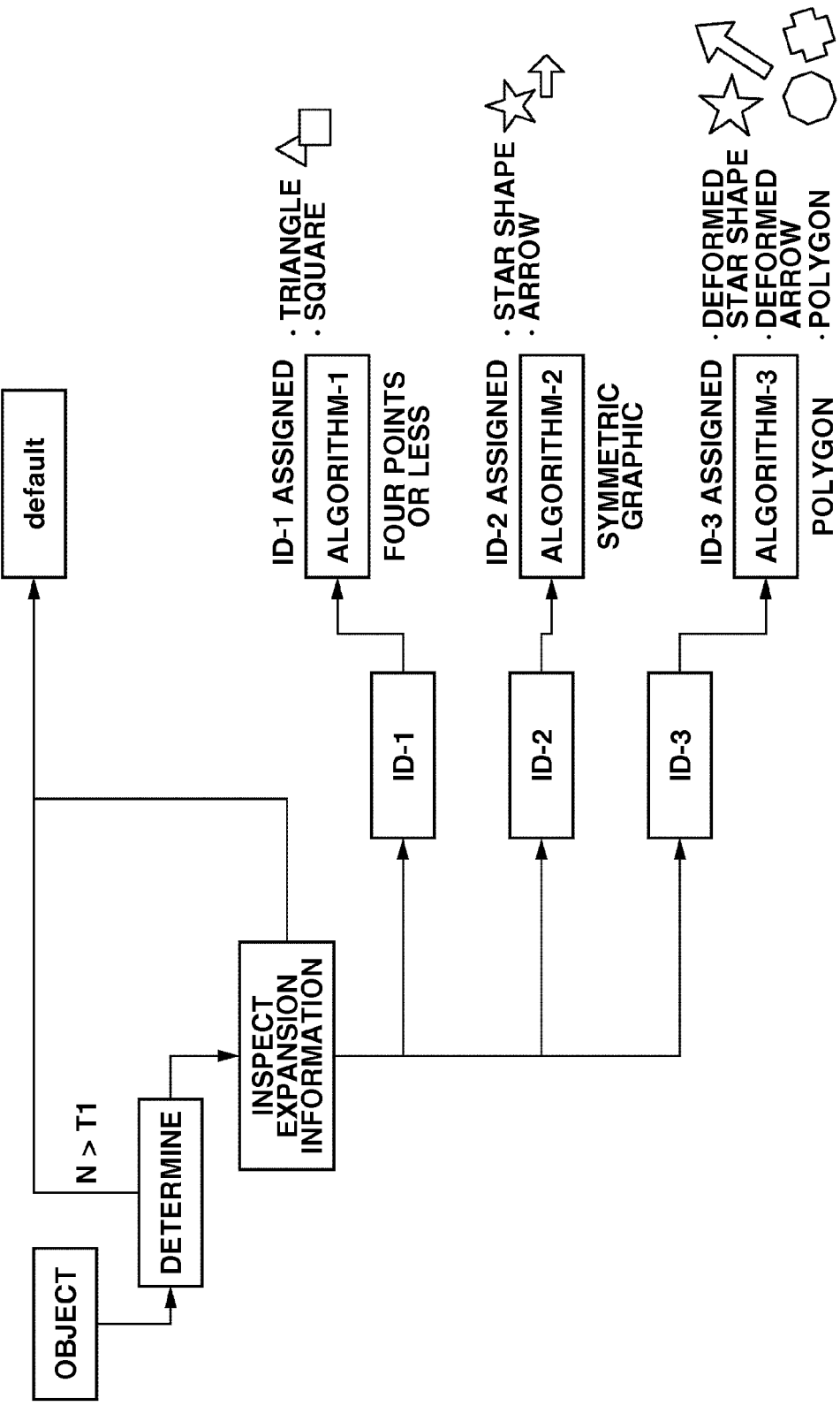
FIG. 24 illustrates the flow of edge information extraction processing in the third exemplary embodiment.

FIG. 24 illustrates the flow of edge information extraction processing in the third exemplary embodiment. The edge extraction processing unit 13 counts the total number N of objects (graphics) in one page by a counter (not illustrated) when an object (graphic) is input. The edge extraction processing unit 13 compares the counted total number N with a previously set threshold value T1. If it is determined that the number of objects N existing in the page is larger than the threshold value T1 as a result of the comparison, the edge extraction processing unit 13 performs scan-line edge detection processing (see FIG. 2) as edge information generation processing, to generate edge information.

On the other hand, if it is determined that the number of objects N existing in the page is the threshold value T1 or less, the edge extraction processing unit 13 switches a processing method based on graphic type identification information added to each object (graphic) to perform edge detection processing, to generate edge information. In the third exemplary embodiment, graphic type identification information is set as expansion information for each object.

The edge extraction processing unit 13 checks whether expansion information exists in each object. If the expansion information does not exist, default processing (scan-line edge detection processing) is performed, to generate edge information. On the other hand, if the expansion information exists, the edge extraction processing unit 13 switches the processing method by referring to recorded graphic type identification information.

If the graphic type identification information is ID-1, for example, the edge extraction processing unit 13 performs processing for a triangle, to perform edge information extraction processing in a similar processing procedure to that in the first exemplary embodiment. In the case of a graphic to which ID-2 is assigned as the graphic type identification information (a graphic having symmetry in a horizontal or vertical direction), for example, the edge extraction processing unit 13 performs edge information extraction processing in the processing procedure for the object assigned ID-2 described in the second exemplary embodiment. In the case of a graphic to which ID-3 is assigned as the graphic type identification information (a polygon that has been rotated and deformed), for example, the edge extraction processing unit 13 performs edge information extraction processing in the processing procedure for the object assigned ID-3 described in the second exemplary embodiment. When the number of objects is larger than a threshold value Tx in the characteristic DB even if expansion information exists, default processing (scan-line edge detection processing) is performed, to generate edge information.

While in the third exemplary embodiment, the characteristic DB is provided in the printer driver, it may be provided in the printer apparatus. The characteristic DB not only statistically has previously measured data. Data stored in the characteristic DB may be updated by measuring a period of time for execution processing in the printer apparatus, as needed.

The printer apparatus and the printer driver may communicate with each other to have similar characteristic DBs (synchronized characteristic DBs), to confirm a status and transfer data. According to the present exemplary embodiment, graphic type identification information used to determine a difference in a graphic type is defined. However, the graphic type identification information may be added from the application software or the printer driver. In order to achieve alignment of a procedure for edge extraction processing corresponding to the type of the graphic type identification information, information maybe transmitted (or communicated), as needed, by a previously determined communication protocol among the application software, the printer driver, and the printer apparatus.

In each of the above-mentioned configurations, the image processing apparatus may have a mechanism for adding ID information suitable for each printer when a print job is generated and managing a correspondence between the ID information to be added and a printer type in its inner part so that the ID information is switched to suitable ID information even if the printer type is changed.

The present invention is also realized even by executing the following processes. More specifically, software (a program) for implementing the function of the above-mentioned exemplary embodiment is supplied to a system or an apparatus via a network or various types of storage media, and a computer (or a central processing unit (CPU) or a micro-processing unit (MPU)) in the system or the apparatus reads out and executes the program. In addition, a computer-readable medium may store a program that causes an image processing apparatus or a print system to perform an image processing method for performing rendering processing.

Figure 25:
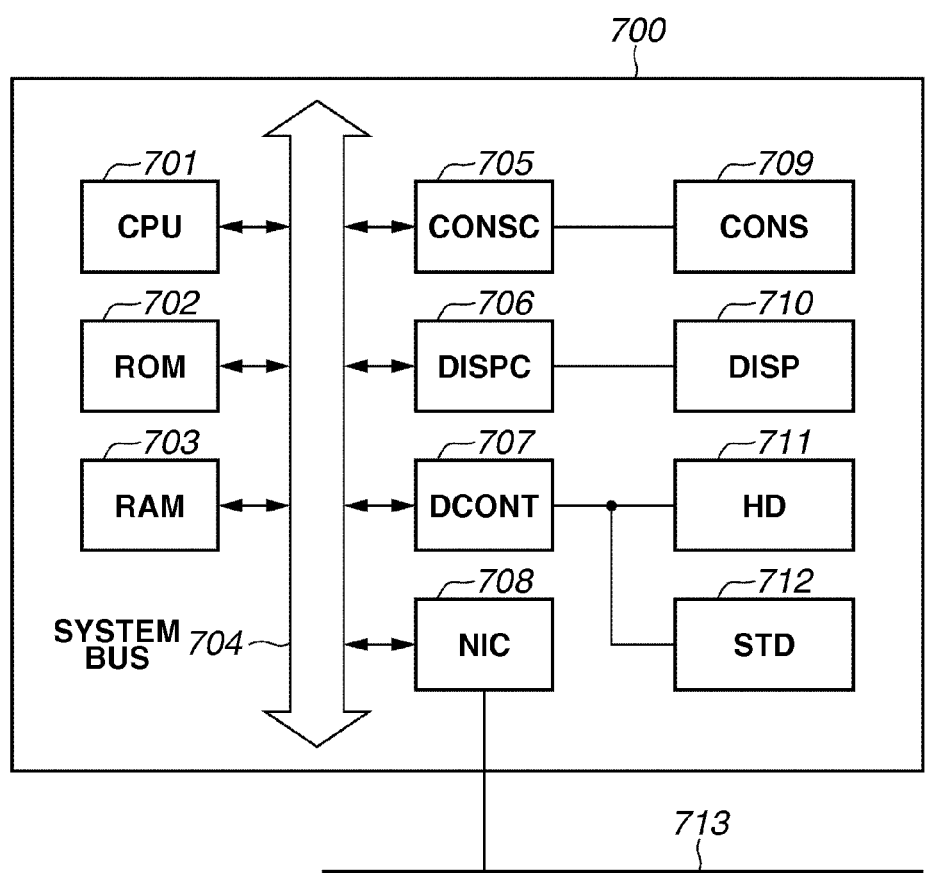
FIG. 25 illustrates a computer function for making an image processing apparatus according to an exemplary embodiment of the present invention feasible.

For example, the image processing apparatus according to the present exemplary embodiment has a computer function 700 illustrated in FIG. 25, and a CPU 701 in the computer function 700 executes operations thereof in the present exemplary embodiment.

The computer function 700 includes a CPU 701, a read-only memory (ROM) 702, and a random access memory (RAM) 703, as illustrated in FIG. 25. It includes a controller (CONSC) 705 for an operation unit (CONS) 709, and a display controller (DISPC) 706 for a display (DISP) 710 serving as a display unit such as a cathode-ray tube (CRT) or a liquid crystal display (LCD). It further includes a hard disk (HD) 711, a controller (DCONT) 707 for a storage device (STD) 712 such as a flexible disk, and a network interface card (NIC) 708. The functional units 701, 702, 703, 705, 706, 707, and 708 are connected to one another to permit communication via s system bus 704.

The CPU 701 executes software stored in the ROM 702 or the HD 711 or software supplied from the STD 712, to collectively control constituent units connected to the system bus 704. More specifically, the CPU 701 reads out a processing program for performing the above-mentioned operations from the ROM 702, the HD 711, or the STD 712 and executes the processing program, to perform control for implementing the operations in the present exemplary embodiment. The RAM 703 functions as a main memory or a work area for the CPU 701.

The CONSC 705 controls input of an instruction from the CONS 709. The DISPC 706 controls display on the DISP 710. The DCONT 707 controls access to the HD 711 and the STD 712 storing a boot program, various applications, a user file, a network management program, and the above-mentioned processing program in the present exemplary embodiment. The NIC 708 bi-directionally exchanges data with another apparatus on the network 713.

The present invention can be used for a printer apparatus, a display apparatus such as a display, or an image output device.

According to exemplary embodiments of the present invention, a processing procedure is switched based on information relating to an input object so that edge information can be generated by performing processing in a suitable processing procedure according to the object. This enables data processing associated with rendering processing to be performed in a suitable processing procedure according to the object, to make higher speed of the rendering processing feasible.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-176928 filed Jul. 29, 2009, which is hereby incorporated by reference herein in its entirety.

What is claimed is:

1. An image processing apparatus for performing rendering processing, the image processing apparatus comprising:
an input unit configured to input an object expressed by line information connecting a first point and a second point;
a classification unit configured to classify a graphic type of the object based on the line information expressing the object; and
a processing unit configured to switch a procedure generating edge information for rendering processing according to the graphic type classified by the classification unit, the rendering processing generating a bitmap from the line information,
wherein the processing unit is configured to perform scan-line edge detection to generate the edge information without regard to the graphic type classified by the classification unit when the input unit inputs objects of more than a predetermined number.

2. The image processing apparatus according to claim 1, wherein the processing unit includes an edge detection processing unit configured to perform edge detection using processing procedure according to the graphic type classified by the classification unit, and an edge information generation unit configured to generate the edge information based on a result of processing by the edge detection processing unit.

3. An image processing apparatus for performing rendering processing, the image processing apparatus comprising:
an input unit configured to input an object expressed by line information connecting a first point and a second point;
a classification unit configured to classify a graphic type of the object based on the line information expressing the object; and
a processing unit configured to switch a procedure generating edge information for rendering processing according to the graphic type classified by the classification unit, the rendering processing generating a bitmap from the line information,
wherein the classification unit classifies the graphic type of the object into one of a first graphic type and a second graphic type based on information relating to the object, and
wherein the processing unit performs tile-based edge detection for the object to generate the edge information when the object is classified into the first graphic type, and performs scan-line edge detection for the object to generate the edge information when the object is classified into the second graphic type.

4. The image processing apparatus according to claim 3, wherein, to generate the edge information, the processing unit performs the tile-based edge detection by specifying positions of tiles in a rendering space and calculating an intersection of the specified position of each of the tiles and a side of the object, and searches a previously calculated database for the edge information based on information relating to the calculated intersection.

5. The image processing apparatus according to claim 3, wherein, when the object has one of three and four sides, the classification unit classifies the object into the first graphic type based on the information relating to the object.

6. The image processing apparatus according to claim 3, wherein, when the object is a symmetric graphic, the classification unit classifies the object into the first graphic based on the information relating to the object.

7. A print system, comprising:
an addition unit configured to add information relating to a graphic type of an object expressed by line information connecting a first point and a second point when a print job is generated;
an input unit configured to input the object;
a classification unit configured to classify the graphic type of the object based on the line information relating to the graphic type of the object added by the addition unit; and
a processing unit configured to switch a processing procedure generating edged information for rendering processing according to the graphic type classified by the classification unit, the rendering processing generating a bitmap from the line information,
wherein the processing unit is configured to perform scan-line edge detection to generate the edge information without regard to the graphic type classified by the classification unit when the input unit inputs objects of more than a predetermined number.

8. An image processing method for performing rendering processing, the image processing method comprising:
inputting an object expressed by line information connecting a first point and a second point;
classifying a graphic type of the object based on the line information expressing the object; and
switching a procedure generating edge information for rendering processing according to the classified graphic type, the rendering processing generating a bitmap from the line information,
wherein switching includes performing scan-line edge detection to generate the edge information without regard to the classified graphic type when inputting includes inputting objects of more than a predetermined number.

9. A non-transitory computer-readable medium having stored thereon, a program that causes an image processing apparatus to perform an image processing method for performing rendering processing, the image processing method comprising:
- inputting an object expressed by line information connecting a first point and a second point;
- classifying a graphic type of the object based on the line information expressing the object; and
- switching a procedure generating edge information for rendering processing according to the classified graphic type, the rendering processing generating a bitmap from the line information,
- wherein switching includes performing scan-line edge detection to generate the edge information without regard to the classified graphic type when inputting includes inputting objects of more than a predetermined number.

10. The image processing apparatus according to claim 1, wherein the classification unit classifies a graphic type of the object based on a complexity of the object.

* * * * *